United States Patent
Deenoo et al.

(10) Patent No.: US 11,902,033 B2
(45) Date of Patent: Feb. 13, 2024

(54) METHODS, APPARATUS AND SYSTEMS FOR RADIO LINK MONITORING (RLM) IN NEW RADIO (NR)

(71) Applicant: InterDigital Patent Holdings, Inc., Wilmington, DE (US)

(72) Inventors: Yugeswar Deenoo, Chalfont, PA (US); Ghyslain Pelletier, Montréal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/097,039

(22) Filed: Jan. 13, 2023

(65) Prior Publication Data

US 2023/0198688 A1 Jun. 22, 2023

Related U.S. Application Data

(63) Continuation of application No. 16/646,491, filed as application No. PCT/US2018/049042 on Aug. 31, 2018, now abandoned.
(Continued)

(51) Int. Cl.
*H04W 76/27* (2018.01)
*H04L 1/20* (2006.01)
(Continued)

(52) U.S. Cl.
CPC ............ *H04L 1/203* (2013.01); *H04L 1/0021* (2013.01); *H04L 1/0026* (2013.01); *H04L 5/005* (2013.01);
(Continued)

(58) Field of Classification Search
None
See application file for complete search history.

(56) References Cited

U.S. PATENT DOCUMENTS

| 2004/0081248 A1 | 4/2004 | Parolari |
| 2011/0170499 A1 | 7/2011 | Nayeb Nazar et al. |

(Continued)

FOREIGN PATENT DOCUMENTS

| CN | 102754381 A | 10/2012 |
| EP | 2916581 A1 | 9/2015 |
| WO | WO 2014068535 A2 | 5/2014 |

OTHER PUBLICATIONS

MCC Support, "Final Report of 3GPP TSG RAN WG1 #AH_NR2 v1.0.0 Qingdao, China, Jun. 27-30, 2017)", 3GPP Tdoc R1-1712032, 3GPP TSG RAN WG1 Meeting #9, Prague, Czech Rep, Aug. 21-25, 2017.
(Continued)

*Primary Examiner* — The Hy Nguyen
(74) *Attorney, Agent, or Firm* — Yin Shao

(57) ABSTRACT

Methods, apparatuses, and systems for radio link monitoring (RLM) implemented by a wireless transmit/receive unit (WTRU) are provided. A representative method for RLM includes mapping, by the WTRU, one or more RLM-RS resources to at least one BLER threshold of a plurality of BLER thresholds. The representative method also includes, for each respective RLM resource that is mapped, determining, by the WTRU, a BLER of the respective RLM-RS resource, and comparing the determined BLER of the respective RLM-RS resource with the at least one mapped BLER threshold associated with the respective RLM-RS resource. The representative method further includes generating, based on one or more of the comparisons, a set of in-sync indications and/or a set of out-of-sync indications, and indicating, by the WTRU, one or more attributes associated with the set of in-sync indications and/or the set of out-of-sync indications.

20 Claims, 15 Drawing Sheets

Related U.S. Application Data

(60) Provisional application No. 62/586,271, filed on Nov. 15, 2017, provisional application No. 62/557,083, filed on Sep. 11, 2017.

(51) Int. Cl.
  *H04W 76/18* (2018.01)
  *H04W 36/00* (2009.01)
  *H04L 1/00* (2006.01)
  *H04L 5/00* (2006.01)
  *H04W 24/08* (2009.01)

(52) U.S. Cl.
  CPC ........... *H04L 5/0075* (2013.01); *H04W 24/08* (2013.01); *H04W 36/0058* (2018.08); *H04W 76/18* (2018.02); *H04W 76/27* (2018.02)

(56) References Cited

U.S. PATENT DOCUMENTS

| | | |
|---|---|---|
| 2015/0271763 A1 | 9/2015 | Balachandran et al. |
| 2016/0007252 A1 | 1/2016 | Larmo et al. |
| 2016/0029234 A1 | 1/2016 | Zhang et al. |
| 2018/0092156 A1 | 3/2018 | Kim et al. |
| 2019/0053293 A1 | 2/2019 | Akoum et al. |
| 2019/0058532 A1 | 2/2019 | Nagaraja et al. |
| 2020/0028545 A1* | 1/2020 | Koskela ............... H04B 7/0408 |
| 2020/0382976 A1 | 12/2020 | Yang |

OTHER PUBLICATIONS

Ericsson, "E-UTRA Out-of-Sync and In-Sync Requirements in DRX", 3GPP Tdoc R4-082490, 3GPP TSG-RAN WG4 Meeting #48bis, Edinburgh, Scotland, UK, Sep. 29-Oct. 3, 2008, 3 pages.

MCC Support, "Final Report of 3GPP TSG RAN WG1 #90 v1.0.0 (Prague, Czech Rep, Aug. 21-25, 2017)", 3GPP Tdoc R1-1716941, 3GPP TSG RAN WG1 Meeting #90bis, Prague, Czech Rep, Oct. 9-13, 2017.

Motorola, "Further details on out-of-sync and in-sync detection", 3GPP Tdoc R4-082560, 3GPP TSG-RAN WG4 Meeting #48bis, Edinburgh, UK, Sep. 29-Oct. 3, 2008, 3 pages.

Interdigital Inc., "RLM/RLF for NR", 3GPP Tdoc R2-1706691, 3GPP TSG-RAN WG2 Ad Hoc, Qingdao, China, Jun. 27-29, 2017, 4 pages.

Huawei et al., "Initial RLM consideration for NR", 3GPP Tdoc R4-1703679, 3GPP TSG-RAN WG4 Meeting #82bis, Spokane, USA, Apr. 3-7, 2017, 2 pages.

Interdigital Inc., "Radio Link Monitoring", 3GPP Tdoc R1-1716261, 3GPP TSG RAN WG1 Meeting NR AH#3, Nagoya, Japan, Sep. 18-21, 2017, 8 pages.

* cited by examiner

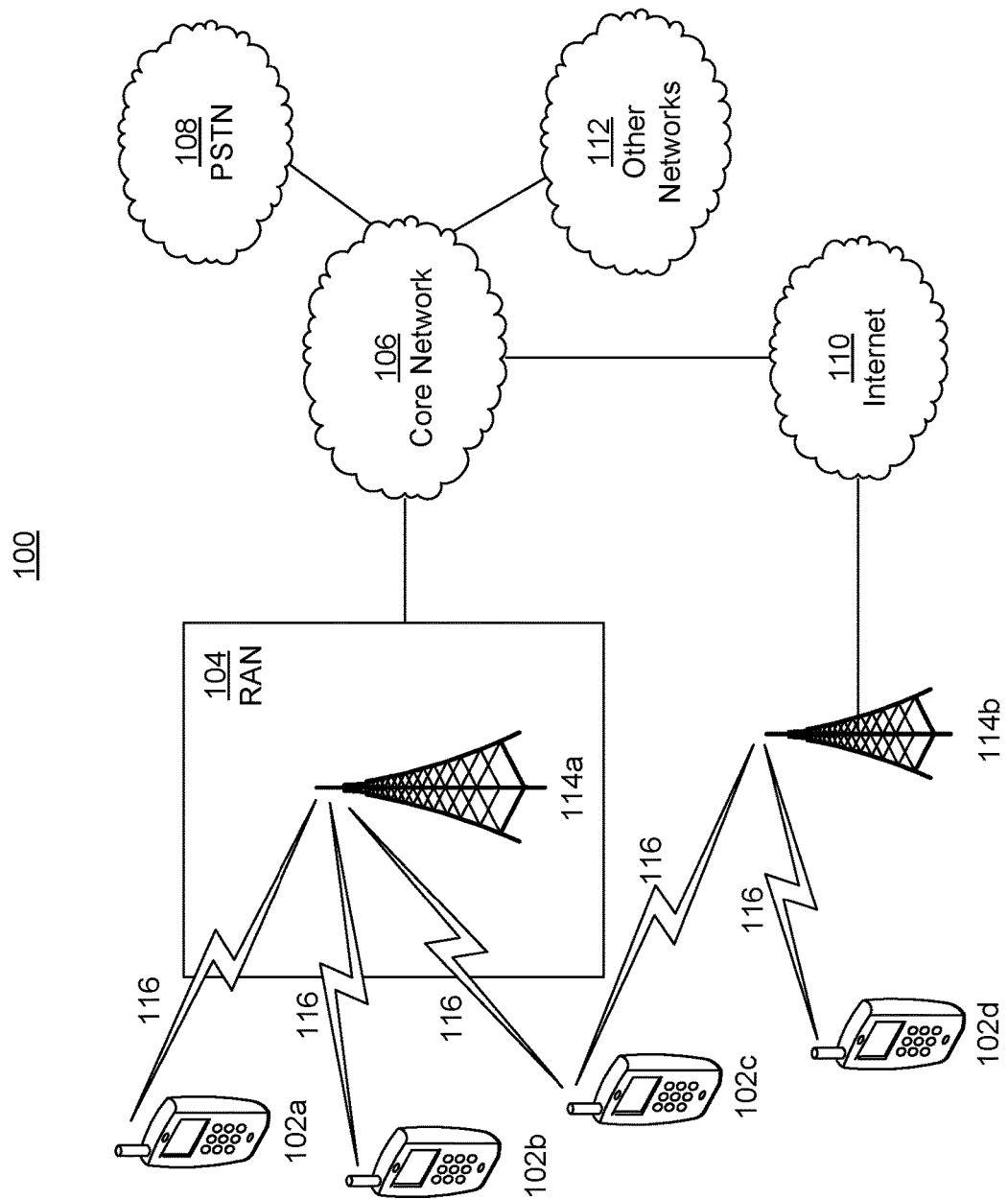

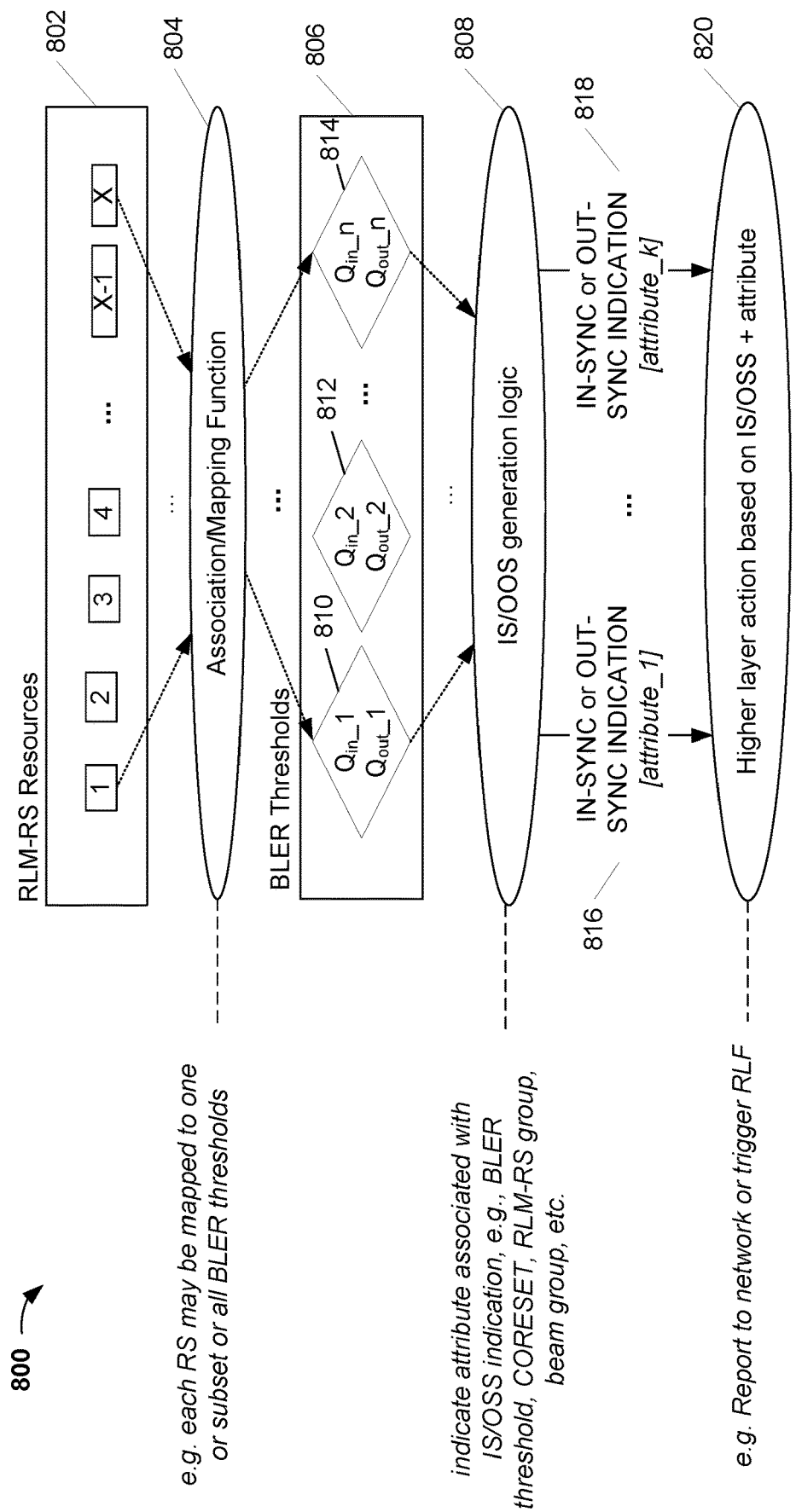

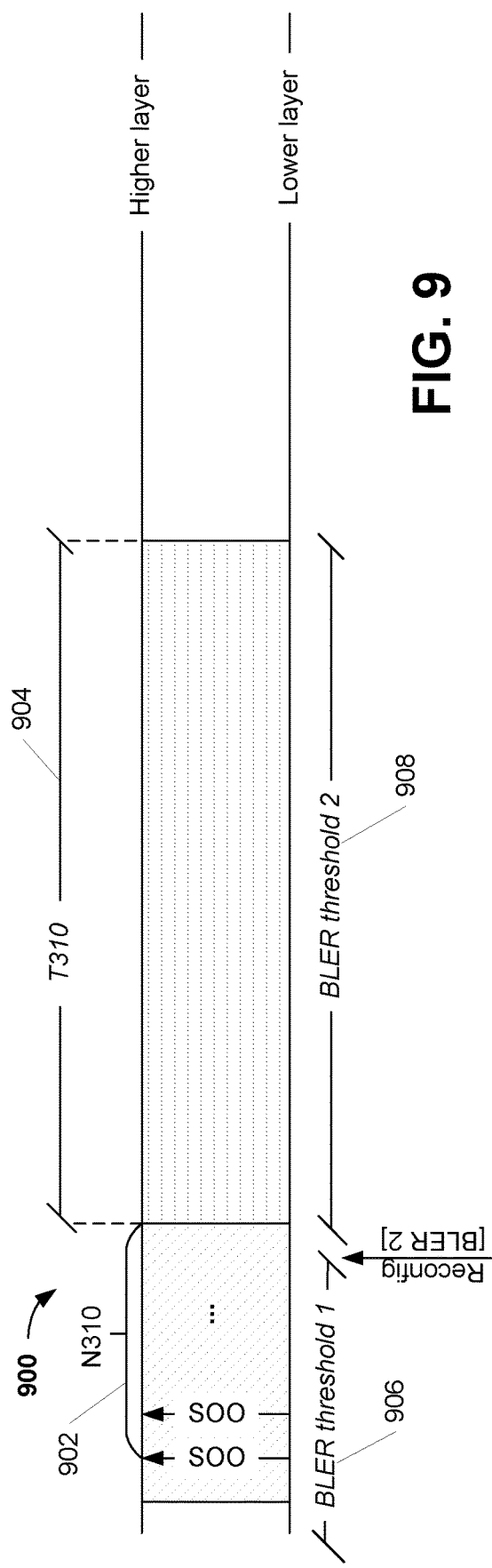
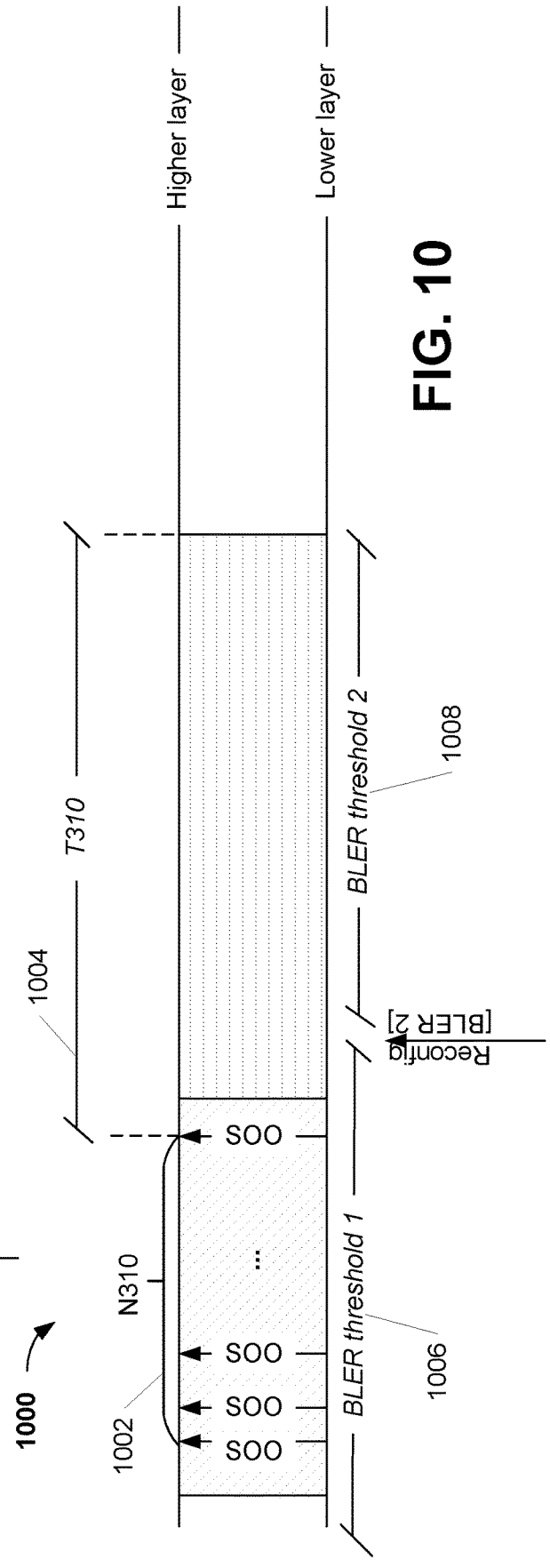

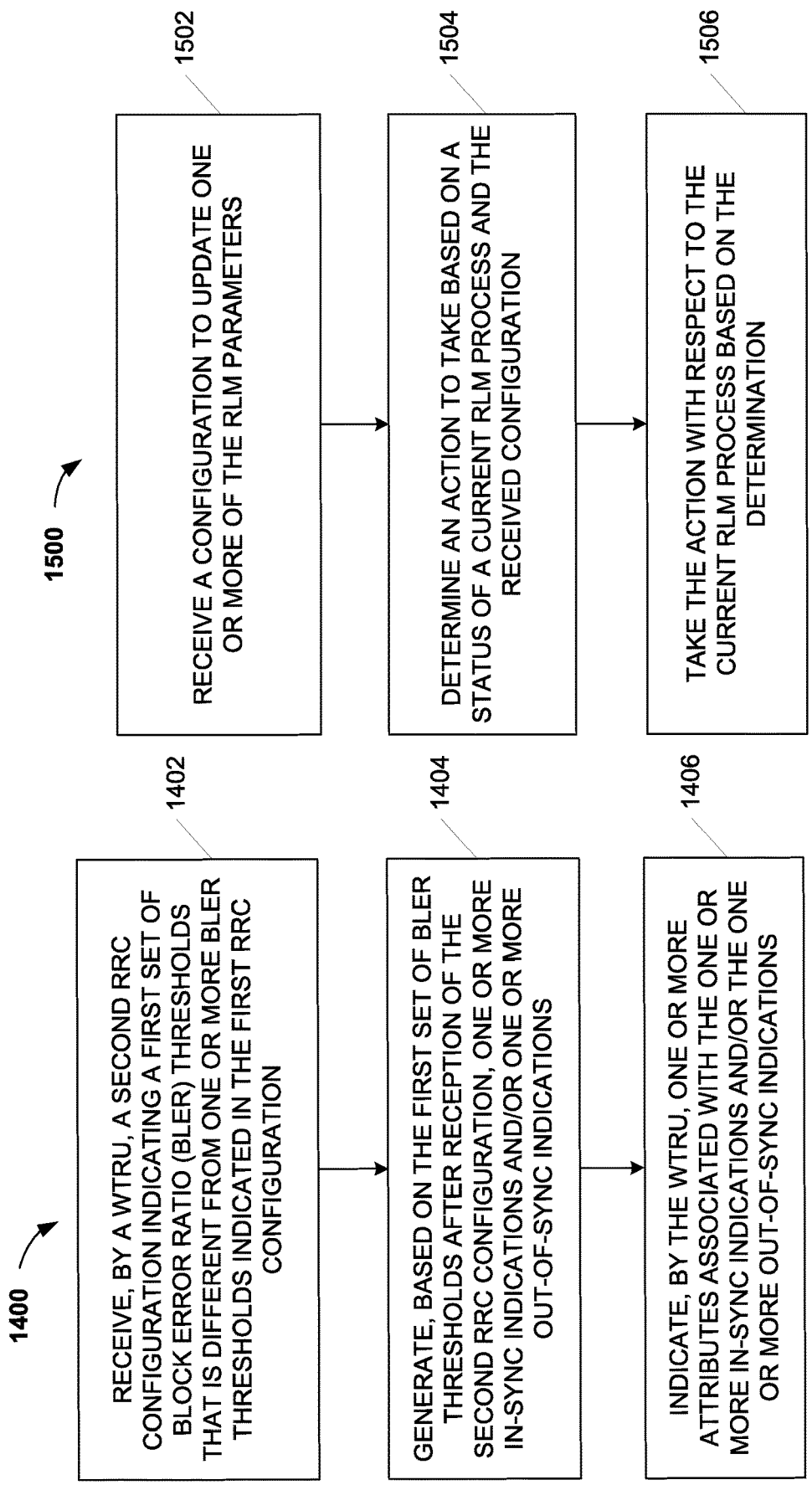

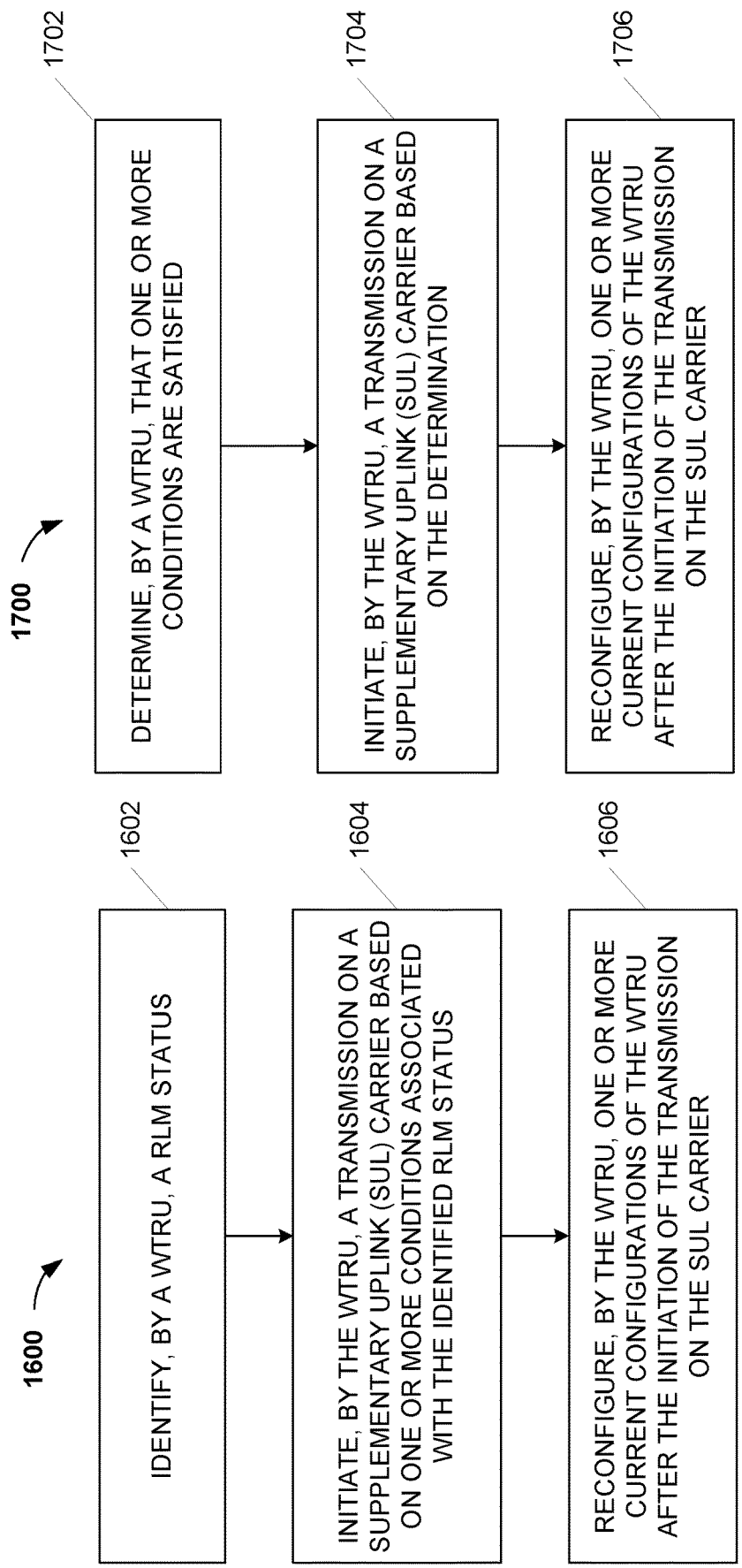

METHODS, APPARATUS AND SYSTEMS FOR RADIO LINK MONITORING (RLM) IN NEW RADIO (NR)

CROSS-REFERENCE TO RELATED APPLICATIONS

This application is a continuation application of U.S. patent application Ser. No. 16/646,491 filed on Mar. 11, 2020, which is a national stage application filed under 35 U.S.C. 371 of International Application No. PCT/US2018/049042 filed on Aug. 31, 2018, which claims priority to and the benefit of U.S. Provisional Application No. 62/557,083 filed in the U.S. Patent and Trademark Office on Sep. 11, 2017, and U.S. Provisional Application No. 62/586,271 filed in the U.S. Patent and Trademark Office on Nov. 15, 2017, the entire contents of each of which being incorporated herein by reference as if fully set forth below in their entirety and for all applicable purposes.

FIELD

The field of the disclosure relates to communications and, more particularly, to methods, apparatus, and systems for communications in an advanced or next generation wireless communications system, including communications for Radio Link Monitoring (RLM) and/or reconfigurations of RLM process in 5G New Radio (NR).

RELATED ART

In Long Term Evolution (LTE), RLM is used to determine radio link failures.

SUMMARY

A representative device has circuitry, including any of a processor, memory, a receiver, and a transmitter. In an example, the processor may be configured to map one or more RLM reference signal (RLM-RS) resources to at least one Block Error Ratio (BLER) threshold of a plurality of BLER thresholds, and for each respective RLM resource that is mapped, the processor may be configured to determine a BLER of the respective RLM-RS resource, and compare the determined BLER of the respective RLM-RS resource with the at least one mapped BLER threshold associated with the respective RLM-RS resource. The processor may be further configured to generate, based on one or more of the comparisons, a set of in-sync indications and/or a set of out-of-sync indications, and indicate one or more attributes associated with the set of in-sync indications and/or the set of out-of-sync indications.

Methods, apparatuses, and systems for RLM implemented in a transmitter/receiver are provided. In an example, a representative method implemented by a wireless transmit/receive unit (WTRU) configured for RLM may include mapping, by the WTRU, one or more RLM-RS resources to at least one BLER threshold of a plurality of BLER thresholds. The representative method may also include, for each respective RLM resource that is mapped, determining, by the WTRU, a BLER of the respective RLM-RS resource, and comparing the determined BLER of the respective RLM-RS resource with the at least one mapped BLER threshold associated with the respective RLM-RS resource. The representative method may further include generating, based on one or more of the comparisons, a set of in-sync indications and/or a set of out-of-sync indications, and indicating, by the WTRU, one or more attributes associated with the set of in-sync indications and/or the set of out-of-sync indications.

BRIEF DESCRIPTION OF THE DRAWINGS

A more detailed understanding may be had from the detailed description below, given by way of example in conjunction with drawings appended hereto. Figures in description, are examples. As such, the figures and the detailed description are not to be considered limiting, and other equally effective examples are possible and likely. Furthermore, like reference numerals in the figures indicate like elements, and wherein:

FIG. 1A is a system diagram illustrating an example communications system in which one or more disclosed embodiments may be implemented;

FIG. 8 is a diagram illustrating a representative RLM framework;

FIG. 9 is a diagram illustrating a first representative RLM process for reconfiguration of one or more BLER thresholds;

FIG. 10 is a diagram illustrating a second representative RLM process for reconfiguration of one or more BLER thresholds;

FIG. 14 is a diagram illustrating a method of a Radio Resource Control (RRC) reconfiguration for an RLM procedure according to one or more embodiments;

FIG. 15 is a diagram illustrating a second method of an RLM procedure according to one or more embodiments;

FIG. 16 is a diagram illustrating a first method of RLM and supplementary uplink (SUL) transmissions according to one or more embodiments; and FIG. 17 is a diagram illustrating a second method of RLM and SUL transmissions according to one or more embodiments.

DETAILED DESCRIPTION

Figure 1B:
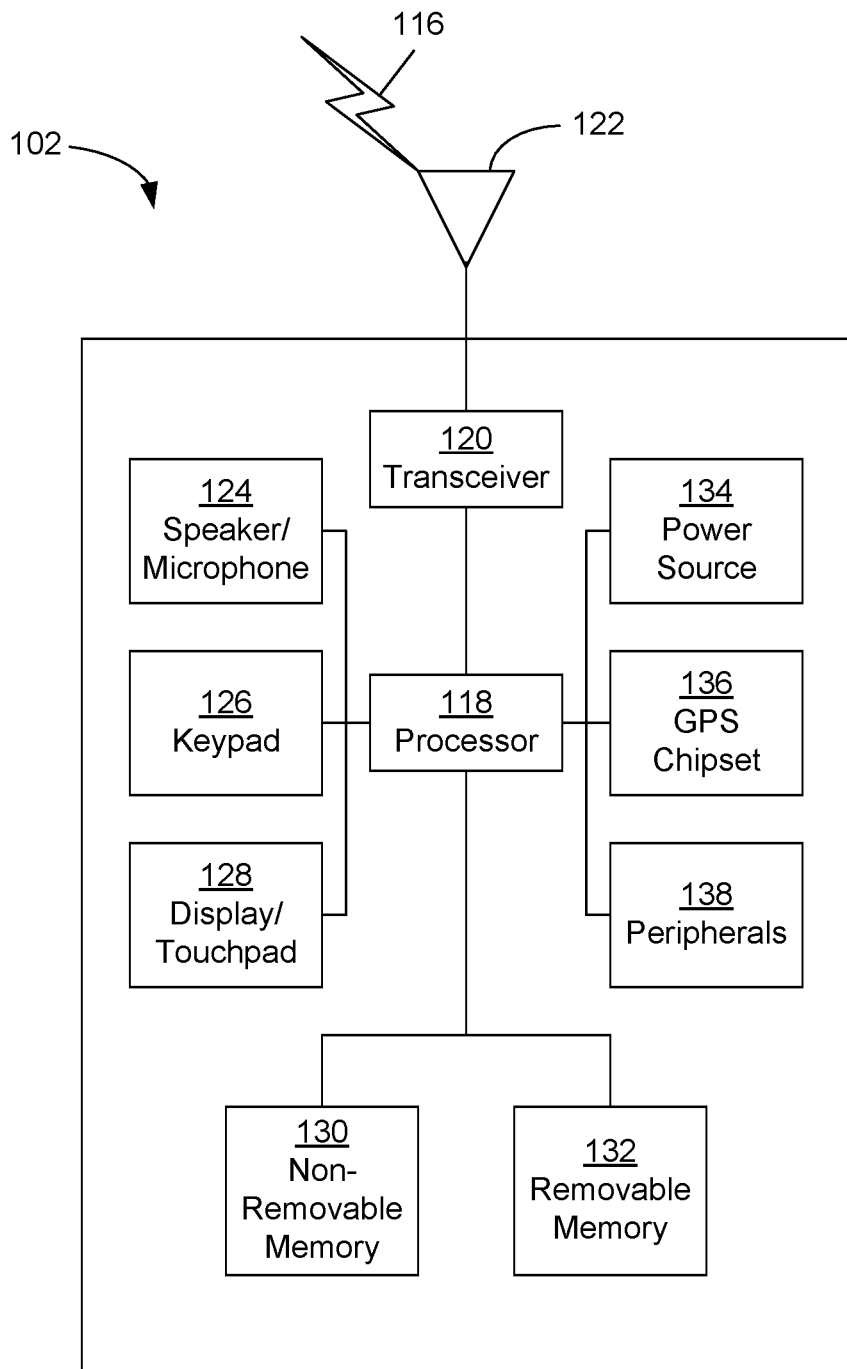
FIG. 1B is a system diagram illustrating an example wireless transmit/receive unit (WTRU) that may be used within the communications system illustrated in FIG. 1A according to an embodiment.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links) For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
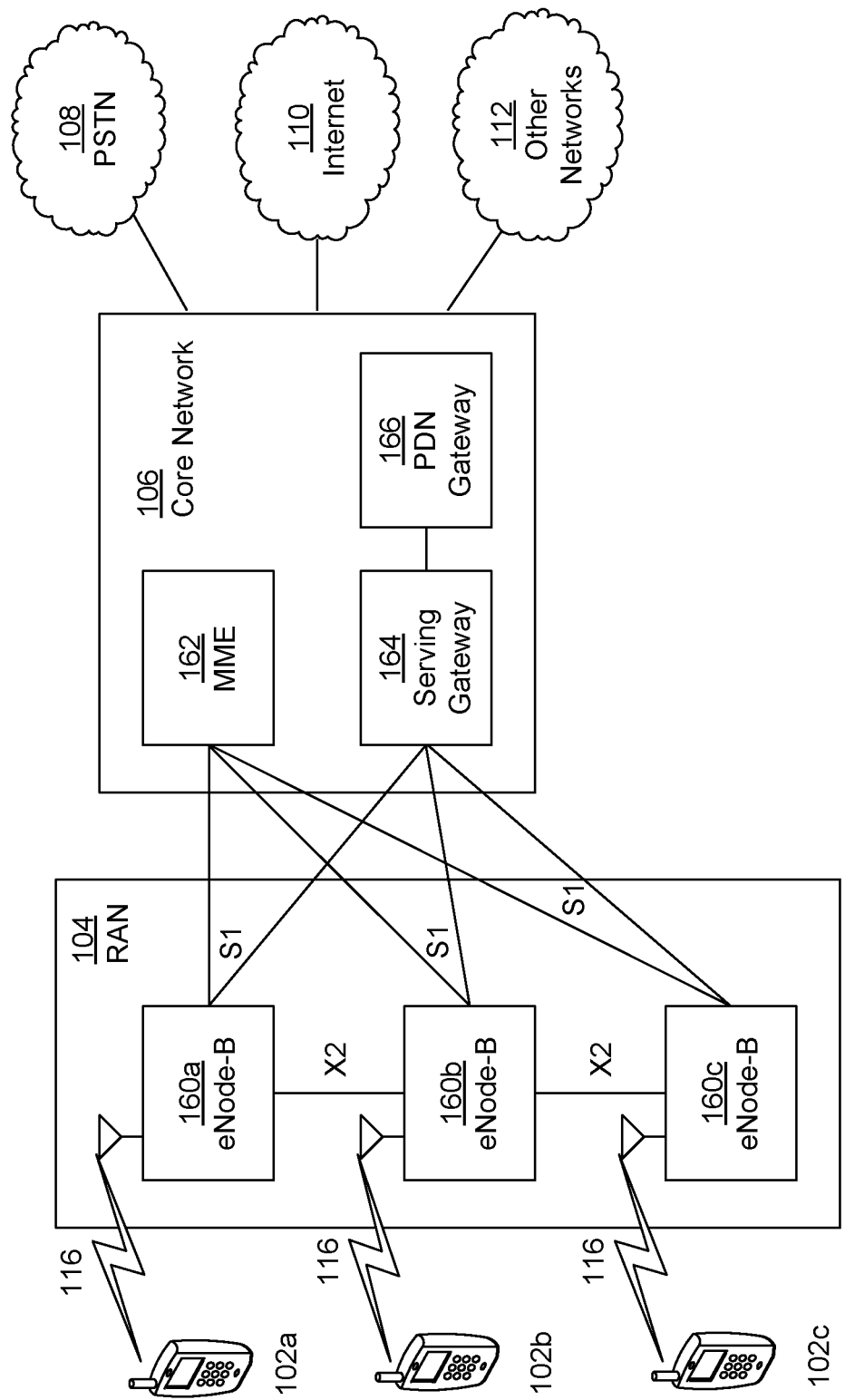
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
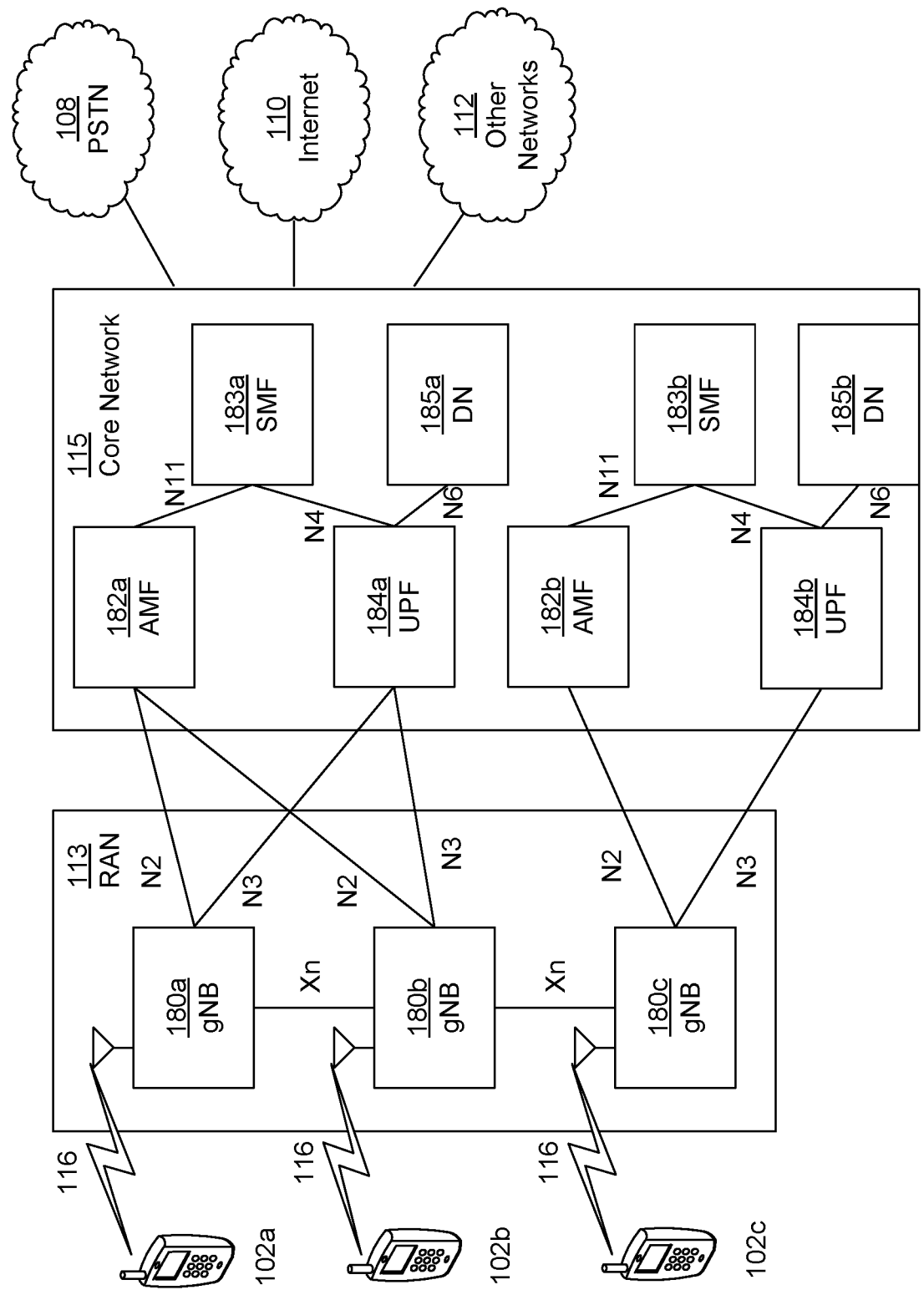
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In certain representative embodiments, methods, apparatus and systems may be implemented for service aware multi-resource radio link monitoring including, for example, associations between or among one or more Radio Link Monitoring (RLM)—Reference Signal (RS) (e.g., RLM-RS) resources and one or more Block Error Ratio (BLER) thresholds, and a generation of IN-SYNC/OUT-OF-SYNC indication.

In certain representative embodiments, methods, apparatus and systems may be implemented for handling reconfiguration of RLM parameters including one or more BLER thresholds and/or one of more RLM-RS configurations. For example, the handling of a reconfiguration may be based on a RLM status of a WTRU, and if applicable, the configuration of a new RLM process may be determined based on the status of an ongoing RLM process and/or the received reconfiguration.

In certain representative embodiments, methods, apparatus and systems may be implemented for handling a flexible RLM and/or a supplemental UL (SUL), including the RLM based triggers to access the SUL, and/or reconfiguration of RLM aspects when initiating SUL transmissions, among others.

Radio Link Monitoring in LTE

Figure 2:
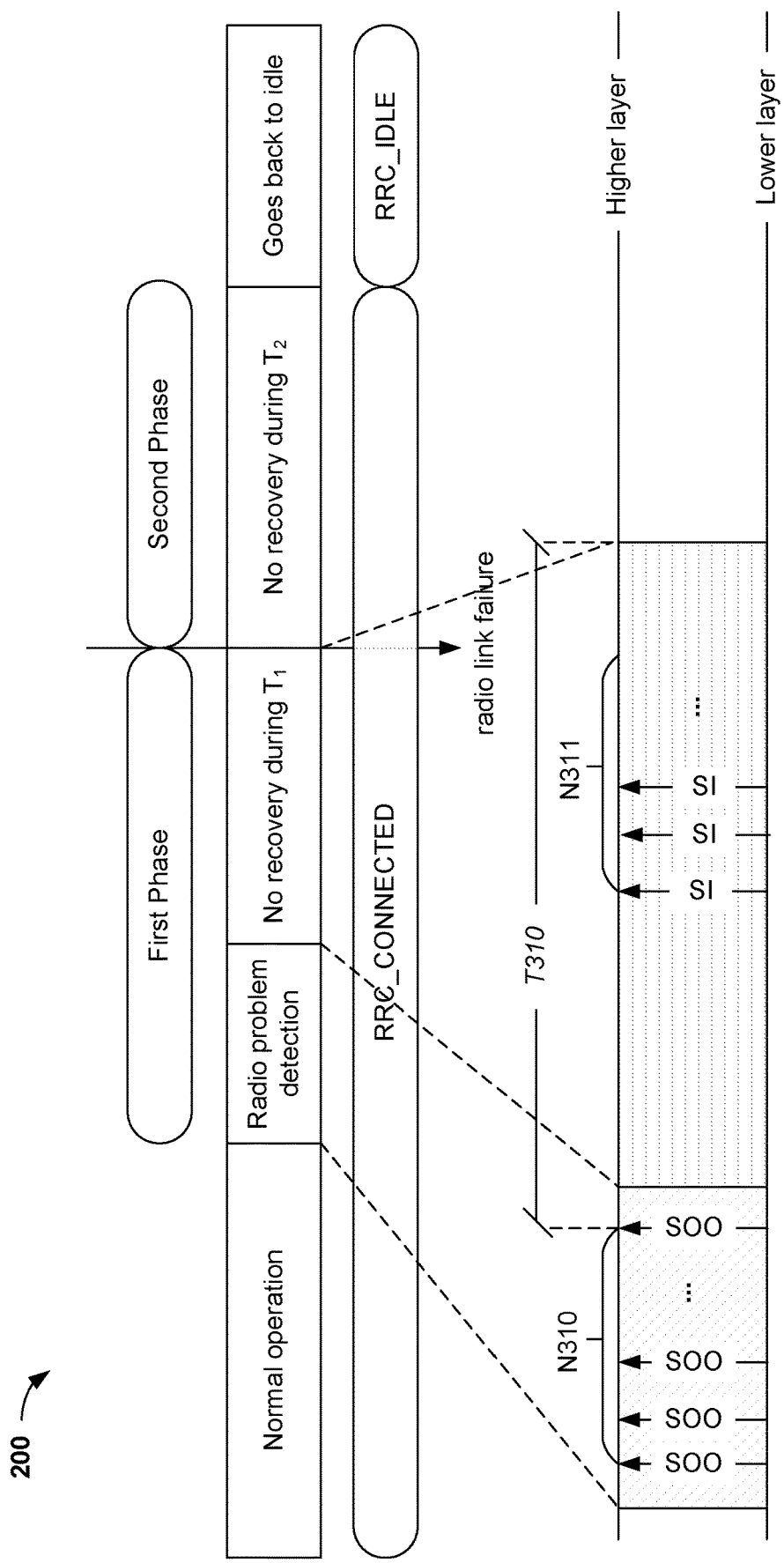
FIG. 2 is a diagram illustrating modeling of a representative RLM procedure in an Long Term Evolution (LTE) network.

FIG. 2 is a diagram illustrating modeling of a representative RLM procedure 200 in a conventional network (e.g., an LTE network). In an LTE network, for example, a WTRU may use always-on signals such as a Cell-specific Reference Signal (CRS) for RLM. In LTE, the WTRU estimates the downlink radio link quality based on the CRS for RLM. The physical (PHY) layer of the WTRU is configured to periodically assess the radio link quality and transmits one or more in-sync indications and/or out-of-sync indications to higher layers based on predefined $Q_{in}$ and/or $Q_{out}$ thresholds. In some examples, the $Q_{out}$ threshold may be defined as the level at which the downlink radio link cannot be reliably received and corresponds to a 10% BLER (Block Error Rate) of a hypothetical Physical Downlink Control Channel (PDCCH) transmission. The threshold $Q_{in}$ may be defined as the level at which the downlink radio link quality may be significantly more reliably received than at $Q_{out}$ and corresponds to a 2% BLER of a hypothetical PDCCH transmission. Those BLER thresholds and the definition of hypothetical PDCCH are both fixed/hardcoded in LTE. When new features (e.g., eMTC, NB-IoT) were supported in some networks or systems (e.g., later LTE releases), new hypothetical PDCCH channels were added for the RLM procedure and were specific to new WTRU categories.

Representative SUL Carrier

A cell may be configured with at least one additional uplink (UL) carrier. For example, in NR, a cell may be configured with a SUL. One motivation for the use of an SUL may be to extend the coverage of a WTRU operating in or at a high frequency (e.g., a frequency and/or frequency band above a threshold) such that the WTRU may perform transmissions on the SUL when configured to a lower frequency and/or a lower frequency band. For example, the SUL may be useful when the WTRU moves towards an edge of coverage of a cell's regular UL carrier (e.g., the RUL). Other possible uses of the SUL may be for provisioning, for example, of specific services, higher throughput, and/or increased reliability and may be possible if the WTRU is configured to perform transmissions on multiple ULs for the concerned cells concurrently (e.g., near and/or substantially concurrently, for example in a Time Division Multiplexed (TDM) fashion).

For example, the SUL may be implemented and/or modeled in NR as a cell with a DL carrier associated with two separate UL carriers. The UL carrier may include and/or consists of a primary UL (which may be in the high frequency band where the DL carrier is or is not located), and a SUL (which may be in a lower frequency band). The terms RUL and SUL are generally used to refer to a regular UL and supplementary UL, respectively. SUL may be configured for any type of cell, including (but not limited to) a primary cell (PCell), a secondary cell (SCell), and/or a Secondary PCell (SPCell), for example for dual connectivity. The SUL may be configured for a standalone system, and/or for a cell of a multi-RAT dual connectivity system.

The WTRU may perform initial access to a cell using a RUL and/or a SUL. The SUL's configuration may be broadcasted in minimum System Information (SI) for a cell. For example, the WTRU may select the SUL for initial access, if the DL quality of the serving cell is below a threshold (e.g., a configured, preconfigured, and/or signaled threshold).

Different operating modes may be possible, for example, for the SUL for the WTRU in Radio Resource Control (RRC) Connected mode. In a first mode of operation, the RRC may configure the WTRU with multiple ULs (ULs), for example one of which is a RUL with a typical UL configuration for the concerned cell, and another one which may minimally include a Sounding Reference Signal (SRS) configuration (e.g., for a SUL). In the first mode of operation, the WTRU may use the RUL for control and data transmission (e.g., some or all control and data transmissions) in the UL. In lieu of or in additional to such use of the RUL, the WTRU may transmit the SRS using resources of the SUL. The RRC reconfiguration may provide an extended, typical and/or possibly complete, UL configuration for a different carrier to activate and/or may switch the applicable active UL carrier for the cell for some or all transmissions.

In a second mode of operation, the RRC may configure multiple ULs with an extended, typical and/or possibly complete, UL configuration. In such a case, the WTRU may have a configuration (e.g., a sufficient configuration) to perform some or all types of UL transmissions (e.g., a Physical Uplink Control Channel (PUCCH), a Physical Uplink Shared Channel (PUSCH) and/or a Physical Random Access Channel (PRACH), among others) on resources of the concerned carriers. The WTRU may receive (e.g., subsequently receive) control signaling (e.g., a MAC CE and/or a downlink control information (DCI), among others) that may activate and/or may initiate a switch between the UL configurations.

In a third mode of operation, the RRC may configure multiple ULs, and two (or more) UL configurations may be active concurrently and/or in a time-division fashion. For example, the third mode of operation may include a restriction such that the WTRU may not be required to (and/or may not) perform some or all types of UL transmissions simultaneously (e.g., the WTRU may not be required to (e.g., and/or may not) transmit a PUSCH for the cell simultaneously on multiple UL carriers. For example, a restriction may be configured for the WTRU, e.g., if the WTRU's capability indicate that simultaneous transmission is not supported (for example, for the configured frequencies and/or frequency bands).

In certain representative embodiments, RLM may be implemented to support diverse set of services. For example, a predefined BLER threshold may not be suited for all types of applications. NR may need and or may provide support for diverse set of services with drastically different QoS, delay and/or reliability requirements, among others, because different services may not be impacted equally for a given hypothetical PDCCH error rate. Based on various use cases, the BLER threshold for a WTRU may be (e.g., may need to be) customized per service. In some scenarios, the RLM procedure may be flexible (e.g., flexible enough) to handle more than one BLER threshold configured concurrently for a WTRU.

In certain representative embodiments, RLM may be implemented to support multi-beams. For example, in the context of a multi-beam system, (e.g., when beamforming may be used to deliver both control and data), in the absence of a CRS, the WTRU may need and/or may use an explicit configuration of one or more RSs to use for RLM. For example, the WTRU may be configured with more than one RSs and each RS may be indicative of quality of a beam, a coreset, and/or a bandwidth part, among others. In certain representative embodiments (e.g., depending on the use case), the type of RS may be configurable, (e.g., whether to use a RS associated with a synchronization block, a Physical Broadcast Channel (PBCH), Demodulation (DM) RS (e.g., DMRS), among others and/or Channel State Information (CSI)-RS (e.g., CSI-RS) based RS. Multiple RLM-RS resources, combined with a customizable BLER threshold may be addressed by the RLM procedure.

In certain representative embodiments, methods, procedures and/or apparatus may be implemented to monitor radio links when diverse services with different error tolerances and multiple RLM RS resources are configured for a WTRU.

In certain representative embodiments, methods, procedures and/or apparatus may be implemented to handle consequences of a flexible RLM procedure. For example, one effect of a flexible RLM procedure, for example may be that the RLM parameters may be reconfigured from one value to another.

In certain representative embodiments, methods, procedures and/or apparatus may be implemented to address: (1) what happens to the current RLM process status when one or more RLM parameters are reconfigured; and/or (2) how to handle the reconfiguration of RLM parameters such that an eventual radio link failure (RLF) may not be delayed and/or (e.g., at the same time) a premature RLF declaration may be avoided.

In certain representative embodiments, methods, procedures and/or apparatus may be implemented to handle consequences of a SUL carrier. For example, such an implementation may address how the RLM framework affect the usage/applicability of SUL carrier and/or what is the difference in RLM behavior when a supplementary carrier (e.g., an SUL carrier) is used instead of and/or in addition to a RUL.

Representative Procedures for a Flexible RLM

For NR, different RS for RLM may be implemented with properties (e.g., desirable properties) such as periodic transmission with short enough periodicity, wideband transmission relative to the bandwidth of the active bandwidth part, support for both single beam and multi-beam operations and/or measure of control channel quality. In NR, two different types of RS (e.g., CSI-RS based and Synchronization Signal (SS) block based) may be supported for RLM. NR may support the configuration of X RLM-RS resources and the configuration of a single RLM-RS type only to different RLM-RS resources for a WTRU at any time. The NR design may support a high degree of spectrum flexibility that may enable deployment in different frequency bands with varying bandwidths. For example, the NR system may support diverse set of services with varying uses/requirements on the Quality of Service (QoS) in terms of throughput, delay and/or reliability. Different services may not be impacted equally for a given hypothetical PDCCH error rate.

For example, to have a flexible RLM that may handle different types of services with varying tolerance for control channel quality, in-sync and out-of-sync BLER thresholds may be implemented to be configurable (e.g., rather than one fixed value). On condition that a WTRU is configured with one or multiple services with similar quality of service/error tolerance, the WTRU may apply one in-sync and out-of-sync BLER threshold (e.g., a common threshold). The common threshold may be: (1) a default threshold or; (2) a configured threshold (e.g., an implicitly or explicitly configured threshold that may be configured by the network, for example from a list of pre-defined BLER thresholds).

On condition that a WTRU is configured with two or more services (e.g., with significantly varying QoS requirements/error tolerance), more than one in-sync and/or out-of-sync BLER thresholds may be configured for the WTRU.

It is observed/contemplated that different types of service may have varying degree of tolerance on PDCCH error rate and, for example, may benefit from a flexible configuration of BLER thresholds for PDCCH quality assessment.

In certain representative embodiments, for example, to address this observation, NR may be implemented to support a configuration of one or more in-sync BLER and one or more out-of-sync BLER per WTRU at a time. In certain examples, the WTRU may be configured with both an eMBB service and URLLC service, concurrently. The eMBB service may tolerate a higher PDCCH error rate than, for example the URLLC service. The WTRU may be configured with two BLER thresholds (e.g., a first BLER threshold that may be associated with the URLLC service and a second BLER threshold that may be associated with the URLLC service). For example, the WTRU may be configured with different actions when quality of a control channel is or goes below certain thresholds (e.g., a first action may be associated with the quality of the control channel being or going below a first BLER threshold and/or a second action may be associated with the quality of the control channel being or going below a second BLER threshold). For example, the WTRU may be configured to transmit a report to the network (e.g., a network entity) when the quality of control channel is or goes below the first BLER threshold. The report may indicate the RS (or RS group) associated with the control channel on which failure was observed. In another example, the WTRU may be configured to trigger beam recovery when the quality of the control channel is or goes below a first BLER threshold. In another example, the WTRU may be configured to expand a search space or monitor alternate serving control channels when the quality of the control channel is or goes below a first BLER threshold. For example, the WTRU may be configured to determine and/or declare a RLF when the quality of the control channel is or goes below the second BLER threshold.

Although first and second BLER thresholds are disclosed herein, any number of services and thresholds are possible. For example, one service may have a plurality of thresholds associated with that service, a plurality of services may have a plurality of thresholds associated with those services and/or a plurality of services may have one threshold associated with these services.

Although first and second BLER thresholds are disclosed herein, other types of thresholds are possible. For example, the threshold may include any of: (1) one or more BLER thresholds; (2) one or more bit error rate (BER) thresholds; and/or (3) one or more other error rate/ratio thresholds, among others.

In some examples, the WTRU may be configured to perform RLM on one or more RLM-RS resources. In some embodiments, the conditions for generating one or more in-sync indications and/or one or more out-of-sync indications may be as follows:

(1) when a WTRU is configured to perform RLM on one or multiple RLM-RS resources;
  (i) Periodic in-sync (IS) may be indicated if the estimated link quality corresponding to a hypothetical PDCCH BLER based on at least Y RLM-RS resource among all configured X RLM-RS resources is above Q_in threshold.
    (a) It is contemplated that Y may be configurable or fixed, and that the value may be a positive integer (e.g., Y=1),
  (ii) It is contemplated that one or more aperiodic indications may be implemented based on a beam failure recovery procedure to assist a RLF procedure if a different RS is used.
(2) Periodic out-of-sync (OOS) is indicated,
  (i) If the estimated link quality corresponding to a hypothetical PDCCH BLER based on all configured X RLM-RS resource(s) is below Q_out threshold;
    (a) It is contemplated that the evaluation of OOS may take beam failure recovery procedure into account.

In some embodiments, NR may support configuration of multiple RLM-RS resources for a specific WTRU, where in the RLM-RS resources (e.g., each RLM-RS resource) may be indicative of the quality of a control channel. The control channel may be associated with a CORESET and/or with a beam pair link.

The generation of one or more in-sync and/or out-of-sync indications may use 'hypothetical PDCCH BLER' similar to LTE. For NR, when more than one RLM-RS resource is configured for a WTRU, consideration of how many of the RLM-RS resources are above or below the Qin/Qout threshold may be conditions to generate in-sync and out-of-sync indications. These conditions may be unambiguous (e.g., straightforward) when only one BLER threshold is configured for a WTRU. In case of multiple BLER thresholds, any of the following may be supported for NR:

(1) a number of (e.g., x) in-sync BLERs and a number of (e.g., x) out-of-sync BLERs for a hypothetical PDCCH;
(2) The number of different BLER values x may be in the range of [1<x≤3];
(3) It is contemplated that one or more in-sync BLER and one or more out-of-sync BLER may be configured per WTRU at a time;
(4) It is contemplated that the default may include one in-sync BLER value and one out-of-sync BLER value are used if not configured; and/or
(5) It is contemplated that the values of the BLERs for a hypothetical PDCCH may correspond to x In-sync and x out-of-sync thresholds, among others.

Figures 3, 4:
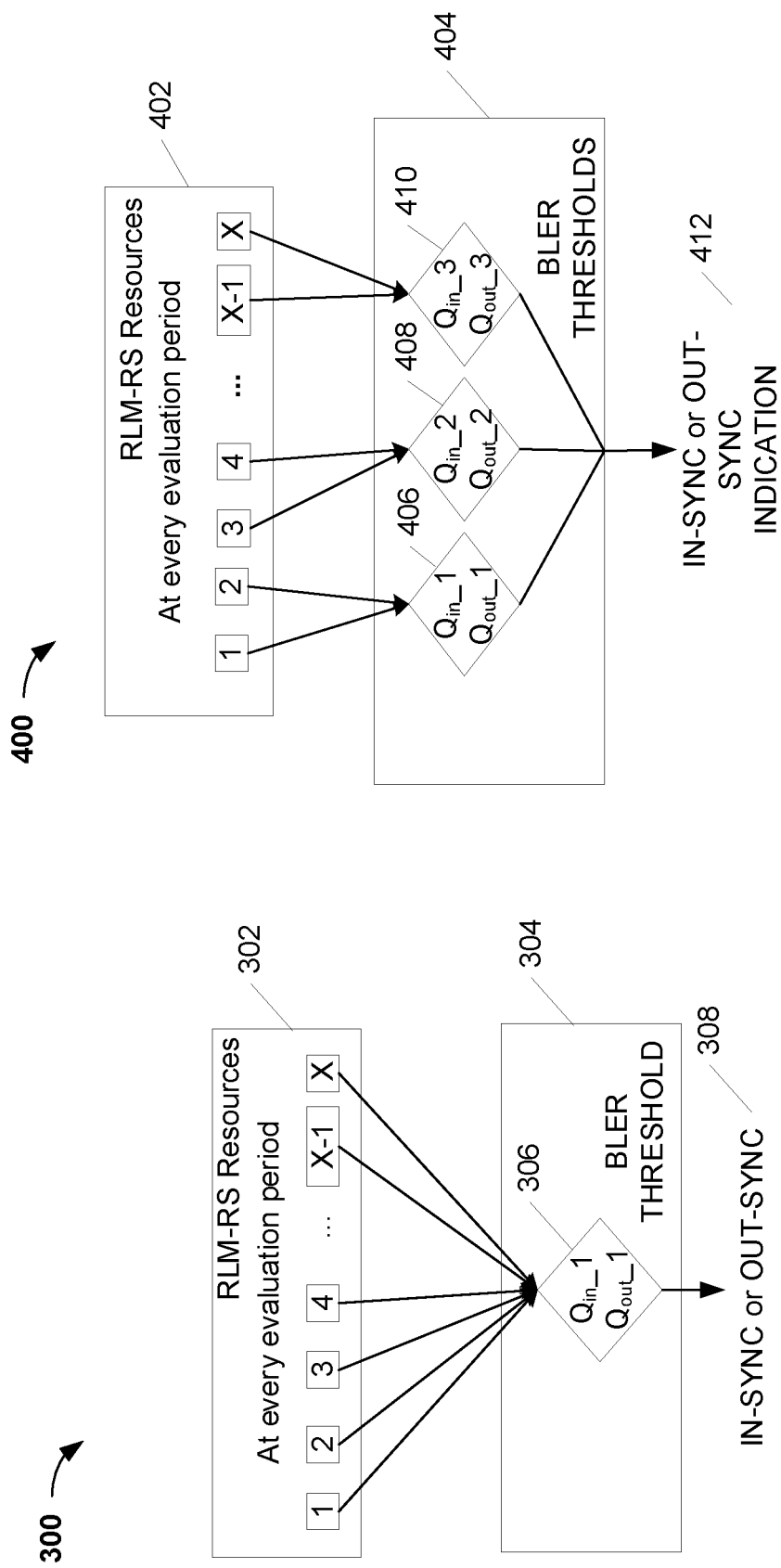
FIG. 3 is a diagram illustrating representative comparison procedures having one BLER threshold.
FIG. 4 is a diagram illustrating representative comparison procedures having two or more BLER thresholds.

When more than one BLER threshold is configured for a WTRU, it may not be clear which BLER threshold is to be (e.g., needs to be) met for the hypothetical PDCCH based on a specific RLM-RS resource. For example, it may not be clear if one RLM-RS resource can be associated with more than one BLER threshold. Based on a linkage between the RLM-RS resource and the configured BLER thresholds, any of the following comparison procedures may be possible:

FIG. 3 is a diagram illustrating a representative comparison procedure 300 using one configured BLER threshold. Referring to FIG. 3, for the comparison procedure 300, the PDCCH quality derived from each of the RLM-RS resources at block 302 may be compared with one of the configured BLER thresholds at block 304 (1<x≤3). In this example, all the RLM-RS resources may be compared with one BLER threshold at block 306. At 308, the WTRU may generate an in-sync indication or an out-of-sync indication (e.g., for transmitting to higher layers) based on predefined Qin and/or Qout thresholds (and/or the comparison(s)) in block 306. For example, BLER measurements associated with the RLM-RS resources 1, 2, 3, . . . X−1, and X may be compared with a configured BLER threshold at block 306 (in block 304), for example in one or more of (e.g., in each of) the evaluation periods.

FIG. 4 is a diagram illustrating a representative comparison procedure 400 using two or more different BLER thresholds for comparison to RLM-RS resources. Referring to FIG. 4, in the representative comparison procedure 400, the PDCCH quality derived from each the RLM-RS resources at block 402 may be compared with one of the configured BLER thresholds (1<x≤3) at block 404, and different RLM-RS resources may be compared with different BLER thresholds in block 406, block 408, and/or block 410. This comparison procedure 400 may be implemented, for example by grouping the different RS associated with the a CORESET and/or a group of CORESETs or beam group and comparing against the BLER specific to that CORESET or CORESET group or beam group. At 412, the WTRU may generate an in-sync indication or an out-of-sync indication (e.g., for transmitting to higher layers) based on predefined Qin and/or Qout thresholds (and/or the comparison(s)) in block 404. For example, BLER measurements associated with a first set of RLM-RS resources (e.g., resources 1 and 2) may be compared with a configured BLER threshold at block 406, measurements associated with a second set of RLM-RS resources (e.g., resources 3 and 4) may be compared with a configured BLER threshold at block 408, and BLER measurements associated with a third set of RLM-RS resources (e.g., resources X−1 and X) may be compared with a configured BLER threshold at block 410.

Although one or more BLER thresholds are shown to be matched to RLM-RS resources in a particular manner, other matches are possible. For example, any number of BLER thresholds may be matched to any number of RLM-RS resources.

Figure 5:
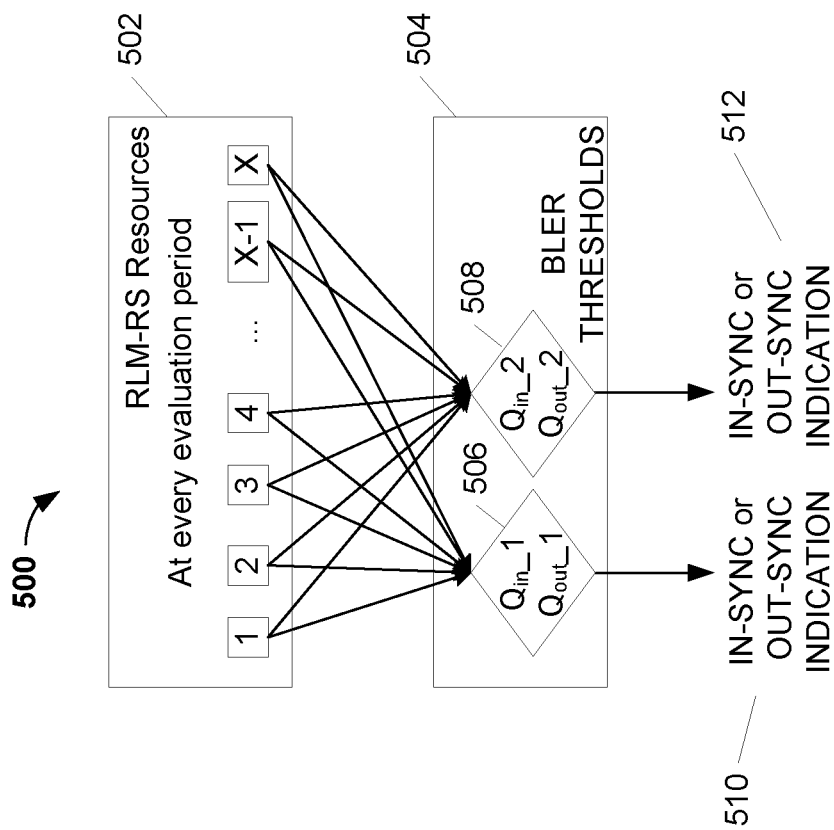
FIG. 5 is a diagram illustrating other representative comparison procedures having two or more BLER thresholds.

FIG. 5 is a diagram illustrating a representative comparison procedure 500. Referring to FIG. 5, for the representative comparison procedure 500, the PDCCH quality derived from each RLM-RS resource at block 502 may be compared with more than one of the configured BLER thresholds (1<x≤3) at block 504, and all of the RLM-RS resources in block 502 may be compared with the same subset of BLER thresholds (e.g., block 506 or block 508) in block 504. At 510 and 512, the WTRU may generate an in-sync indication or an out-of-sync indication (e.g., for transmitting to higher layers) based on predefined Qin and/or Qout thresholds (and/or the comparison(s)) in block 504. For example, BLER measurements associated with the RLM-RS resources (e.g., resources 1, 2, 3 . . . X−1 and X) may be compared with a first configured BLER threshold at block 506 and a second configured BLER threshold at block 508.

Although BLER thresholds are shown to be matched to RLM-RS resources in a particular manner, other matches are possible. For example, any number of BLER thresholds (e.g., 1 to N) may be matched to the RLM-RS resources 1, 2, 3 . . . X−1 and X.

Figure 6:
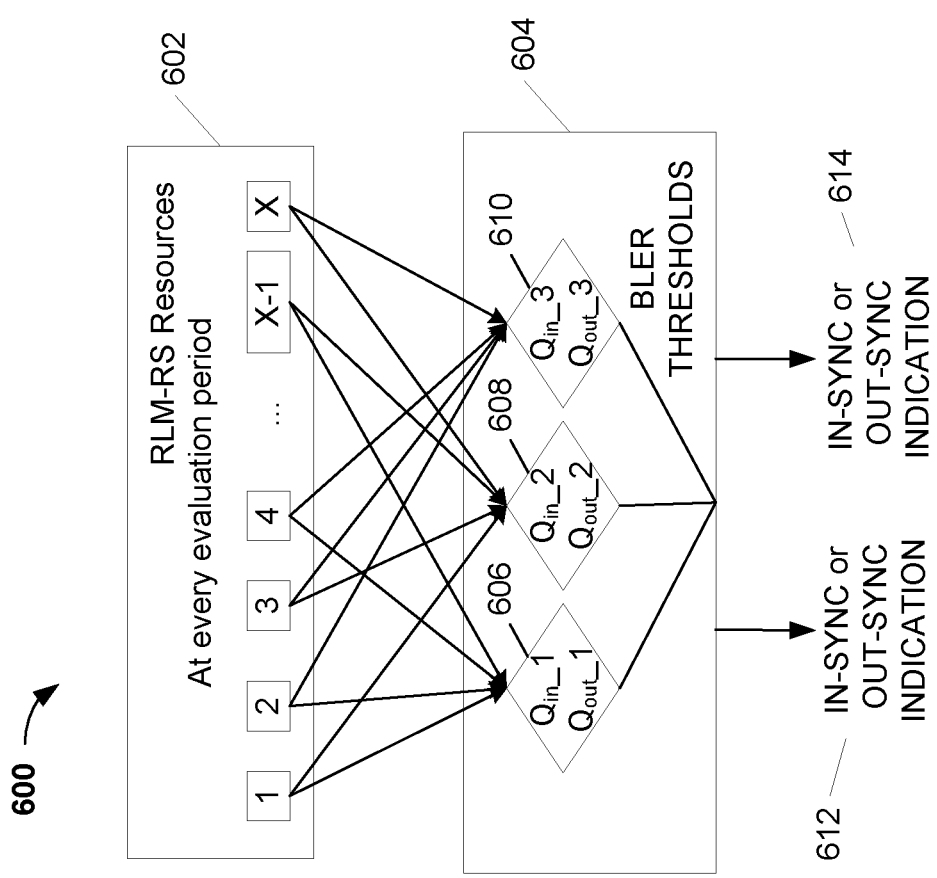
FIG. 6 is a diagram illustrating additional representative comparison procedures having two or more BLER thresholds.

FIG. 6 is a diagram illustrating a representative comparison procedure 600. Referring to FIG. 6, for the representative comparison procedure 600, the PDCCH quality derived from each RLM-RS resource at block 602 may be compared with more than one of the configured BLER thresholds (1<x≤3) at block 604 and different RLM-RS resources in block 602 may be compared with different subset of BLER thresholds in block 604. This comparison procedure may be implemented, for example, by grouping different RSs associated with a CORESET or a group of CORESETs or beam group and comparing against the BLER specific to that CORESET or CORESET group or beam group. At 612 and 614, the WTRU may generate an in-sync indication or an out-of-sync indication (e.g., for transmitting to higher layers) based on predefined Qin and/or Qout thresholds (and/or the comparison(s)) in block 604. For example, BLER measurements associated with a first RLM-RS resource (e.g., resource 1) may be compared with the configured BLER threshold at block 606 and the configured BLER threshold at block 608. The BLER measurements associated with a second RLM-RS resource (e.g., resource 2) may be compared with the configured BLER threshold at block 606 and the configured BLER threshold at block 610. The BLER measurements associated with a third RLM-RS resource (e.g., resource 3) may be compared with the configured BLER threshold at block 608 and the configured BLER threshold at block 610. The BLER measurements associated with a fourth RLM-RS resource (e.g., resource 4) may be compared with the configured BLER threshold at block 606 and the configured BLER threshold at block 610.

Although BLER thresholds are shown to be matched to RLM-RS resources in a particular manner, other matches are possible. For example, any number of BLER thresholds may be matched to any number of RLM-RS resources.

Figure 7:
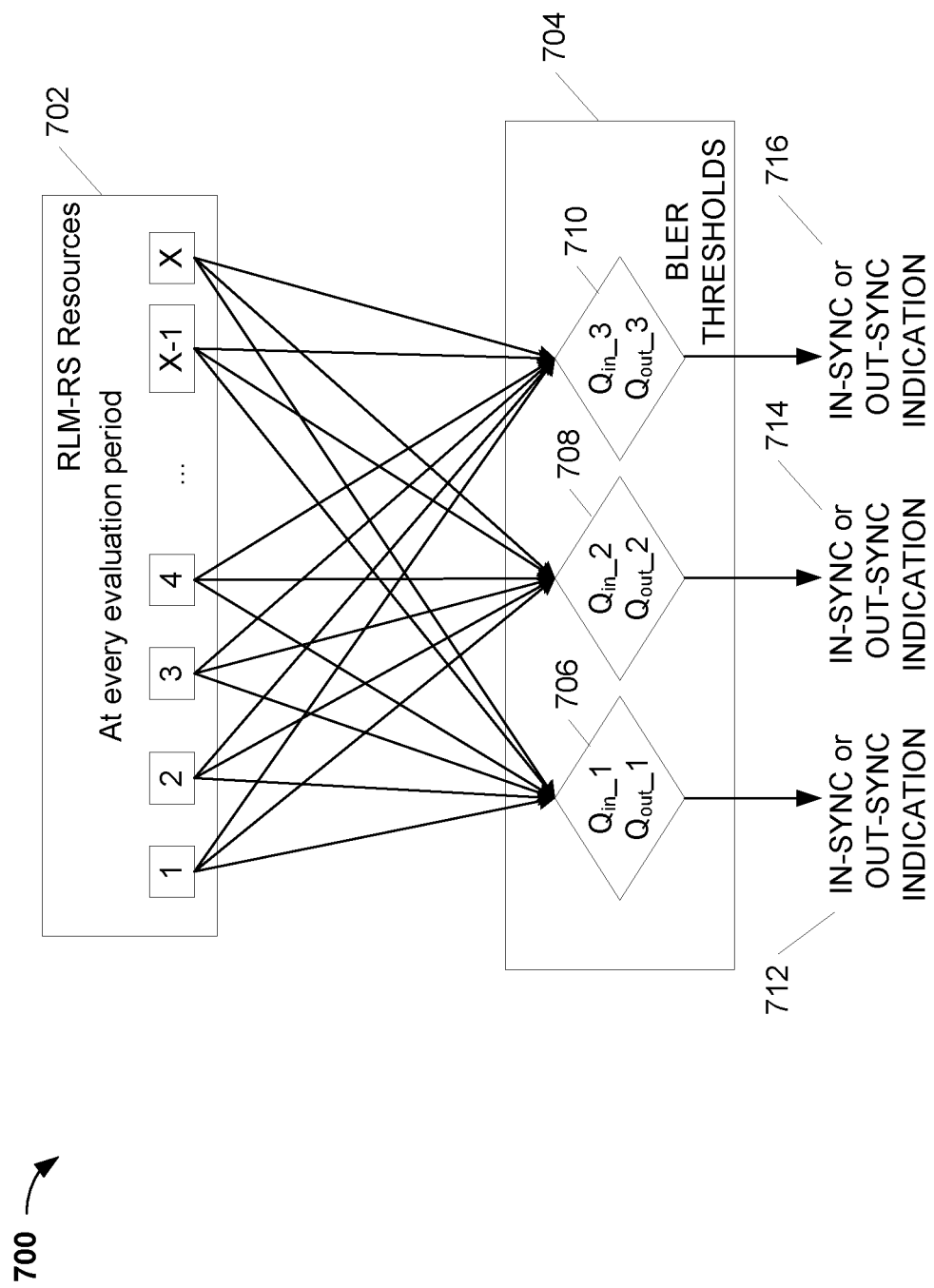
FIG. 7 is a diagram illustrating yet other representative comparison procedures having two or more BLER thresholds.

FIG. 7 is a diagram illustrating a representative comparison procedure 700. Referring to FIG. 7, for the representative comparison procedure 700, the PDCCH quality derived from each RLM-RS resource at block 702 may be compared, at block 704, with all the configured BLER thresholds (1<x≤3) (e.g., block 706, block 708, block 710). At 712, 714, and/or 716, the WTRU may generate an in-sync indication or an out-of-sync indication (e.g., for transmitting to higher layers) based on predefined Qin and/or Qout thresholds (and/or the comparison(s)) in block 704.

Although BLER thresholds are shown to be matched to RLM-RS resources in a particular manner, other matches are possible. For example, each of the BLER thresholds may be matched to each of the RLM-RS resources.

In some embodiments, based on the different comparison procedures described herein, any of the following observations or contemplations may be made:

If more than one BLER threshold is configured (e.g., concurrently), procedures/comparisons may be implemented that clarify and/or determine which BLER thresholds are to be evaluated for each configured RLM-RS resource.

If hypothetical PDCCH quality based on each RLM-RS resource is compared against more than one BLER threshold, it may be possible that more than one IN-SYNC or OUT-OF-SYNC indication may be generated.

In certain representative embodiments, any of following are made in the case where X RLM-RS resources and multiple BLER thresholds are configured, (e.g., concurrently) for a WTRU.

NR may support a configuration of one or more BLER thresholds for the evaluation of hypothetical PDCCH quality derived from each RLM-RS resource or RLM-RS resource group.

NR may support a configuration of an association between and/or among a RLM-RS resource and one or more corresponding BLER thresholds, for example to evaluate the hypothetical PDCCH quality derived from such RLM-RS resources and/or RLM-RS resource group.

The association may be implicit or explicit. The association may be a function of a RLM-RS type (e.g., a CSI-RS and/or SS Block RS). For example, such an association may be part of RLM-RS resource configuration.

It is contemplated how to generate IN-SYNC (IS) and/or OUT-OF-SYNC (OOS) indications, if more than one BLER threshold is applied for a hypothetical PDCCH quality derived from each RLM-RS resource or RLM-RS resource group. In one example, multiple IS indications and/or OOS indications may be delivered to higher layers (e.g., RRC) in a reporting instance. In such a case, the higher layers (e.g., RRC) may differentiate (e.g., may need to differentiate) the cause of such an indication from lower layers (e.g., Layer 1). For example, a higher layer (e.g., RRC) may be configured to perform different actions based on the cause of IS/OOS indications. In one example, the IS or OOS indication may carry an additional attribute that may indicate any of the following: (1) the RLM-RS resource/RLM-RS resource group/RLM-RS type associated with the indication; (2) the CORESET/CORESET group associated with the indication; (3) the beam group associated with the indication; and/or (4) the BLER threshold associated with the indication, among others.

In one representative embodiment, when multiple IS or OOS indications are generated at lower layers, further rules may be defined to map those multiple indications to a single indication to higher layers. The examples of such mapping functions may include any of: (1) if the number of IS indications is higher than or equal to OOS indications at the lower layers, then IS indications may be indicated to higher layers, else, an OOS indication may be generated; (2) if a predefined number of OOS indications is generated for a preconfigured subset of BLER thresholds, then an OOS indication may be generated to higher layers; and/or (3) if at least one OOS indication is generated at lower layers, then an OOS indication may be indicated to higher layers, among others.

Representative Framework for Flexible RLM

Referring to FIGS. 3-7, different examples of the mapping/association function and IS/OOS generation logic are disclosed. In some embodiments, to support diverse services in varying deployment scenarios, it may be useful and/or beneficial to have a flexible RLM framework.

FIG. 8 is a diagram illustrating a representative RLM framework 800. In some embodiments, a WTRU may be configured with two or more RLM-RS resources at block 802, for example to account for multi-beam scenarios and/or multiple bandwidth parts.

In some embodiments, a WTRU may be configured with two or more BLER thresholds at block 806, for example, to determine the quality of a control channel or performance of a control channel in a higher level of granularity compared to the conventional framework. In a conventional (e.g., legacy) framework, the RLM may track certain states (e.g., only two states) of a control channel (e.g., whether the control channel works). By configuring more than one BLER threshold (e.g., in block 810, block 812, and/or block 814), the WTRU may be enabled to evaluate and/or report the performance of the control channel with a higher granularity. Such higher level of granularity may, for example enable adaptation of a radio link to meet specific service uses and/or requirements. In some implementations or deployments, a higher level of granularity may, for example, enable activation of a SUL carrier, if available and/or appropriate.

In some embodiments, at block 804, a WTRU may be configured with an association between or among reference signal (e.g., RLM-RS) resources (e.g., each reference signal resource) in block 802 and at least one BLER threshold in block 806. The WTRU may use the association information in block 804 to generate a respective IS/OOS indication (e.g., one or more IS/OOS indications output from block 806) for a respective RLM-RS resource.

In some embodiments, at block 808, a WTRU may be configured to differentiate the IS/OOS indications generated from lower layers (or from block 806) based one or more attributes associated with the IS/OOS indications (e.g., using pre-configured IS/OOS generation logic). For example, the attributes (e.g., BLER threshold, CORESET, RLM-RS group, and/or beam group, among others) may be associated with one or more IS/OOS indications, for example, IS/OOS indication 816 and/or IS/OOS indication 818.

In some embodiments, at block 820, a WTRU may be configured with a mapping for one or more actions and associated rules as to when to trigger a particular action. For example, a rule may be, may include, and/or may be based on a function of a number of IS/OOS indications, and/or a nature attribute associated with such indications, among others. In certain representative embodiments, the WTRU may be configured to report to the network (e.g., a network entity, or a gNB) when the number of consecutive OOS indications are above a threshold and the attribute associated with such indications refer to a first BLER threshold. In an example, the WTRU may be configured to send a report when the quality of the control channel stays lower than a first BLER threshold for more than a predefined time period and/or the WTRU may transmit the report in a RRC message or a MAC CE. For example, the WTRU may be configured to indicate a current status of a RLM process/procedure in the report. The report may include a quantized BLER of a hypothetical control channel. For example, the report may include the status (e.g., an IS counter and/or an OOS counter) of RSs configured for RLM. In certain representative embodiments, the report may indicate the status (e.g., whether running or not) of a T310 timer implicitly and/or explicitly. In certain representative embodiments, the WTRU may be configured to switch UL transmissions to a SUL when the quality of the control channel is below a first threshold for a predefined time period. For example, the WTRU may be configured to determine and/or declare RLF when the number of consecutive OOS indications is above a threshold and/or the attribute associated with the consecutive OOS indications refer to a second BLER threshold.

Representative Procedures for Handling RLM Parameter Reconfiguration

In certain representative embodiments, processing of a reconfiguration may be based on a RLM status of a WTRU, and if applicable, the configuration of the new RLM process may be determined based on status of the ongoing RLM process and/or the received reconfiguration.

A WTRU may be configured to evaluate a status of a current RLM process according to a context of the received RLM reconfiguration. For example, a WTRU may determine whether one or more aspects of the current RLM process influence if and/or how the received reconfiguration may be applied.

A WTRU may be configured to apply a reconfiguration (for example, including a RLM parameter reconfiguration) as a function of the current status of the RLM process including the status of counters related to lower layer problem detection and/or status of one or more RLF timers, among others.

A WTRU may determine the configuration of the new RLM process (e.g., the RLM process after reconfiguration) as a function of the current RLM process status (e.g., the RLM process before a reconfiguration) and contents of a received reconfiguration.

For a given RLM reconfiguration, a WTRU may perform different actions based on the status of the current RLM process. A WTRU may be configured to reset, continue and/or update the RLM status according to the received reconfiguration. For example, the WTRU may perform one or more or combinations of the following actions upon receiving a reconfiguration:

(1) Reset RLM process/status:
    the WTRU may determine that the status of the current RLM process is not relevant in light of the received configuration which may update one or more of the RLM parameters. The WTRU may be configured to reset a RLM process (including any of: one or more counters, and/or one or more timers, among others) associated with a stringent radio link quality requirement when a new configuration is received with a relaxed radio link quality requirement. This scheme may be beneficial to avoid premature RLF triggering, if current RLM status is maintained;

(2) Continue RLM process/status:
    the WTRU may determine that the status of the current RLM process is still relevant in light of the received configuration which may update one or more of the RLM parameters. The WTRU may be configured to continue the RLM process (including any of: the one or more counters, and/or the one or more timers, among others) associated with a relaxed radio link quality requirement when a new configuration is received with stricter radio link quality requirement. This scheme may be beneficial to avoid delayed RLF triggering, e.g., to avoid the WTRU being in a poor radio link condition for extended periods of time, if the current RLM status is reset;

(3) Penalty based scheme:

the WTRU may be configured to apply a penalty to the new RLM process based on the status of the current RLM process. This scheme may be referred to as a hybrid reset/continue scheme (e.g., the WTRU may reset the current RLM process, and may define and/or include a mechanism/means to influence the new RLM process based on a status of the current RLM process), for example, when radio link issues are/were observed/determined with the current RLM process. In some representative embodiments, the WTRU may apply counters/timers for the new RLM process based on the status of counters/timers for the current RLM process. For example, the WTRU may apply a shorter T310 timer and/or a smaller N310 value or a larger N311 value for the new RLM process, when: (1) the T310 was already started/running, (2) when a remaining time is less than a threshold and/or (3) when a number of OOS is above a threshold for the current RLM process;

(4) Fairness based scheme:

the WTRU may ensure that the new RLM process has a fair chance to determine the radio link quality according to the configured parameters. For example, the WTRU may not declare and/or determine a RLF before a minimum time has elapsed such that the minimum time is at least as long as the time set and/or required to receive IS indications sufficient to stop a running RLF timer, if applicable. In one representative embodiment, the WTRU may be configured to set the T310 according to the following rule:

Set T310=max(minTime, T310 remaining);

where minTime=N311*IS periodicity;

(5) Status of RLM process leading to reconfiguration failure:

a WTRU may be configured to determine and/or declare a reconfiguration failure, if application/execution of a reconfiguration is or may be detrimental to the RLM procedure. For example, the WTRU may be configured to apply the reconfiguration when (e.g., only when) the current RLM status satisfies a predefined criteria and/or criterion. The WTRU may be configured to apply a reconfiguration with stricter radio link quality requirements when (e.g., only when) the current RLM status does not indicate lower layer problems. For example, the WTRU may be configured to apply the reconfiguration when T310 is not running. For example, the WTRU may be configured to apply the reconfiguration when (e.g., only when) the T310 remaining is above a threshold. For example, the WTRU may be configured to apply the reconfiguration when at least N RLM-RS generate IS indications. Upon failure to apply the reconfiguration, the WTRU may report a reconfiguration failure to the network. For example, the WTRU may include a cause for the reconfiguration failure indicating the status of RLM process, as reason for failure.

(6) Based on Explicit Indication:

the WTRU may be explicitly configured in the reconfiguration message with if and/or how the current RLM process influences the new RLM process. For example, the indication may signal one or more of the above schemes for RLM process handling Representative Configuration Aspects Prior to receiving a WTRU specific configuration, a WTRU may be configured to apply default RLM parameters which may be: (1) predefined; (2) obtained from minimum SI; and/or (3) obtained from on-demand SI. The WTRU may be configured to update RLM parameters via implicit or explicit reconfiguration.

A WTRU may be configured to handle the reconfiguration (e.g., by RRC, by MAC and/or by L1 signalling, among others) of one or more parameters associated with the RLM procedure. In some examples, the WTRU may implicitly reconfigure one or more RLM parameters based on one or more preconfigured events. For example, the reconfigurable RLM parameters may include any one or more of the following:

(1) one or more BLER thresholds (e.g., which may be selected from a predefined set of value pairs (IS and OOS thresholds), BLER thresholds may be changed at different granularities e.g., a change to a IS threshold only or a change to a OOS threshold only or a change to both the IS threshold and the OOS threshold);

(2) a number of RLM-RS resources (e.g., a configurable number up to X RLM-RS resources);

(3) one or more specific RLM-RS resources (e.g., among N RLM-RS in the cell, a subset e.g., X RLM-RSs that may be specific to the WTRU);

(4) a RLM-RS type (e.g., CSI-RS based and/or SSB based);

(5) a configuration of the hypothetical PDCCH (e.g., a number of control symbols, a bandwidth (BW), an aggregation level, a DCI format/size, and/or a transmit power, among others);

(6) one or more resources for the RLM-RS transmission (e.g., location and/or density of the resources in time and/or in the frequency domain, e.g., a periodicity, a BW, among others);

(7) one or more filtering parameters (e.g., filter coefficients);

(8) one or more timers (e.g., T310 and/or T312, or a similar timer, among others); and/or (9) one or more counters/values (e.g., N310 and/or N311, or a similar counter, among others), among others.

Representative Triggers for Reconfiguration

An explicit and/or implicit reconfiguration to RLM parameters may be triggered for example, due to establishment, update and/or removal of one or more services which may result in a change of radio link quality requirement. For example, the WTRU may be configured with two or more BLER thresholds and/or may switch from one BLER threshold to another BLER threshold, for example, for radio link monitoring. In one example, a change of RLM parameters may be triggered based on a WTRU coverage. For example, the WTRU may reconfigure the RLM parameters based on any of: (1) one or more measurements, (2) control channel performance, and/or (3) an input from beam management, among others. In other examples, a change of RLM parameters may be triggered, for example due to a change in characteristics of the RLM-RS at the lower layers, including but not limited to any of: (1) a number of RS, (2) a bandwidth, (3) a type of RS, and/or (4) a resource for RS, among others. For example, the RLM reconfiguration may be triggered due to WTRU mobility. For example, the WTRU may be configured to perform a RLM evaluation more frequently. In certain representative embodiments, the RLM reconfiguration may be triggered, for example, due to a change in a control channel configuration. For example, when the control channels are Quasi-Co located (QCLed)

with SS block, the type of RLM-RS may be based on the SS block. For example, when the control channels are not QCLed with SS block, the type of RLM-RS may be based on CSI-RS. A reconfiguration of RLM-RS may be triggered based on a beam management procedure at the lower layers. In some examples, the WTRU may be configured to determine the RLM-RS based on the beam management RS. In certain embodiments, the RLM-RS may be a subset of the beam management RS. In other embodiments, the RLM-RS may be a superset of the beam management RS. A RLM-RS may be associated with a bandwidth part. A reconfiguration of the RLM-RS may be triggered by a change in an active bandwidth part of a WTRU.

Representative WTRU Procedure to Handle Reconfiguration of BLER Threshold

A WTRU may receive a control message to reconfigure from a first BLER threshold to a second BLER threshold. The WTRU may apply the reconfiguration based on the current RLM status and the nature of the BLER threshold change (e.g., a change from a stricter BLER threshold to a relaxed (e.g., more relaxed) BLER threshold or from a relaxed BLER threshold to stricter (e.g., more strict) BLER threshold). In this context, the term 'strict' BLER threshold may refer to a lower BLER threshold (e.g., in a range of about 1% BLER, for example 0.1% to 10%) e.g., that may require a higher radio link quality, whereas a 'relaxed' BLER threshold may refer to a higher BLER threshold (e.g., in the range of about 10% BLER, for example 10% or above) e.g., that may accommodate comparatively lower radio link quality.

The WTRU may be configured to handle a reconfiguration based on the current RLM status. Some examples of RLM statuses are set forth herein. For a RLM process in a normal state (e.g., with no lower layer issues determined and/or detected), since there are no lower layer issues, the WTRU may apply reconfiguration of BLER threshold (e.g., configure lower layers with new threshold, irrespective of whether the reconfiguration is from a 'strict' BLER threshold to a 'relaxed' BLER threshold, or vice versa).

FIG. 9 is a diagram illustrating a representative RLM process 900 in which one or more OOS indications are sent from the lower layer and received by the higher layer, but not enough OOS indications are received (e.g., the number of OOS indications received is less than a threshold number, for example, less than the N310 value) to start a timer 904 (e.g., the timer T310). In an example, the timer 904 may be configured to start based on consecutive OOS indications and after expiry may cause a Radio Link Failure (RLF) to be declared. For example, the timer 904 may be configured to start after a threshold number (e.g., equal to N310) of OOS indications and may be stopped after the same or a different threshold number of IS indications (and/or reset) after expiry and an RLF is declared.

Referring to FIG. 9, since the lower layer problems may not be determined to be critical (e.g., the timer 904 has not started based on the number of OOS indication(s) received by the higher layer being below the value N310), the WTRU may be configured to apply a similar handling for the RLM process in a normal state. In an example, after a BLER threshold reconfiguration, the WTRU may reset the RLM process, (e.g., reset the OOS counter, when reconfiguring from a 'strict' BLER threshold to a more 'relaxed' BLER threshold). In this example, reconfiguration of one or more BLER thresholds may include reconfigure the BLER threshold from a first BLER threshold 906 to a second BLER threshold 908. In another example, the WTRU may continue the current RLM process (e.g., does not clear the OOS counter, when reconfiguring from a first BLER threshold 906 to a second BLER threshold 908, for example, from the 'relaxed' BLER threshold to the more 'strict' BLER threshold).

FIG. 10 is a diagram illustrating a representative RLM process 1000 in which the timer 1004 (e.g., timer T310) is running (e.g., the timer 1004 has started based on the number of OOS indication(s) received by the higher layer reaching the value N310) and no IS indications are sent from the lower layer and/or received by the higher layer. In an example, the timer 1004 may be configured to start based on consecutive OOS indications and after expiry may cause an RLF to be declared. For example, the timer 1004 may be configured to start after a threshold number (e.g., equal to N310) of OOS indications and may expire after a preconfigured period. For example, the timer 1004 may be configured to expire if no IS indications are received or if the number of IS indication(s) received by the higher layer at the WTRU is less than a threshold value (e.g., the value N311) during the preconfigured period. If the timer 1004 expires, a RLF may be declared.

Referring to FIG. 10, since lower layer problems are detected (e.g., the timer 1004 has started based on the number of OOS indication(s) received by the higher layer reaching the value N310), the WTRU may be configured to perform different actions based on the BLER threshold before and/or after the reconfiguration. For example, the WTRU may reconfigure the BLER threshold from a first BLER threshold 1006 to a second BLER threshold 1008. When reconfiguring from the 'relaxed' BLER threshold to the more 'strict' BLER threshold, the WTRU may apply a penalty to account for periods of poor radio condition which existed before the reconfiguration. The penalty may be set and/or realized in terms of a reduced value N310 (e.g., the number of consecutive OOS indications to start the timer 1004), a higher value N311 (e.g., the number of consecutive IS indications to stop the timer 1004), and/or a reduced T310 timer value (e.g., expiry period), among others. In some cases, upon or after receiving N311 consecutive in-sync (IS) indications, the WTRU may stop the timer 1004 (e.g., the timer T310). In some examples, the WTRU may apply a fairness criteria/criterion by setting the value of the timer T310 such that the new RLM configuration has a chance to recover the link before RLF. In certain representative embodiments, the WTRU may not apply the reconfiguration and may report a reconfiguration failure: (1) if the T310 timer is running; (2) if the T310 timer is close to expiry (e.g., when the time remaining for the T310 timer is below a threshold level), and/or (3) when reconfiguring from the 'relaxed' BLER threshold to the 'strict' BLER threshold, among others. In some cases, when reconfiguring from the 'strict' BLER threshold to the 'relaxed' BLER threshold, the WTRU may reset the RLM process (e.g., the one or more counters/timers), or may reset the RLM process and apply a penalty (e.g., adjusting one or more timers and/or counters) to account for poor radio conditions that existed before the reconfiguration. In some other cases, the WTRU may continue the RLM process but may apply a reward (e.g., adjusting one or more timers and/or counters) to account for a relaxed BLER condition after the reconfiguration.

Figure 11:
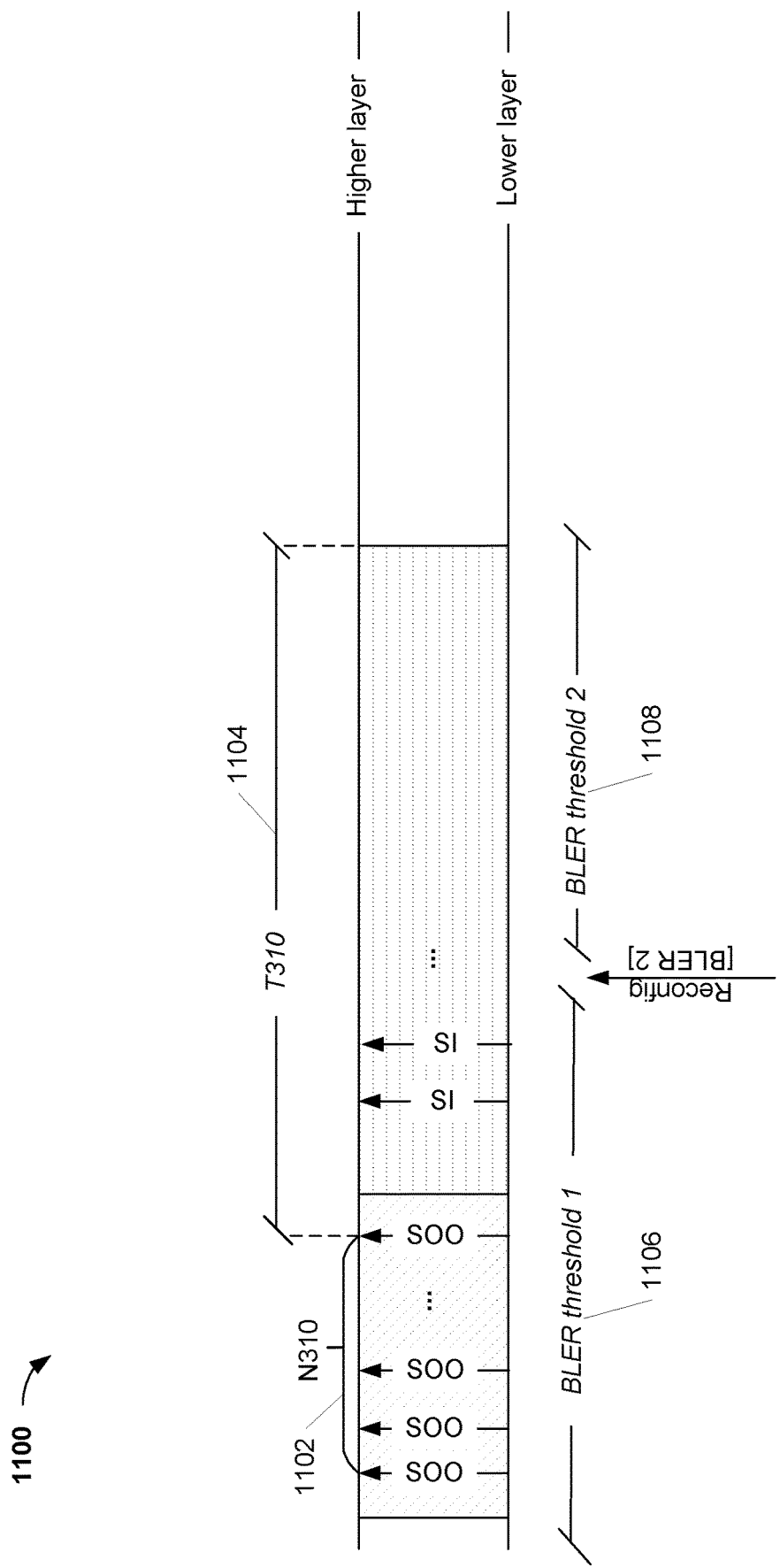
FIG. 11 is a diagram illustrating a third representative RLM process for reconfiguration of one or more BLER thresholds.

FIG. 11 is a diagram illustrating a representative RLM process 1100 in which the timer 1104 has started based on the number of OOS indication(s) received by the higher layer reaching the value N310 and one or more IS indications are sent from the lower layer and received by the higher layer during the preconfigured period (e.g., while the T310 timer is running and prior to reconfiguration), but not enough IS indications are received (e.g., less than the value N311) to stop a timer 1104 (e.g., the timer T310). For example, the number of IS indications received by the higher layer is less than a threshold number, for example, less than the N311 value, to stop the timer 1104.

Referring to FIG. 11, the WTRU may be configured to perform similar actions as for those shown in FIG. 10, as discussed above. In some embodiments, the WTRU may be configured to perform additional actions considering one or more IS indications received when the timer 1104 (e.g., the timer T310) was running. For example, the WTRU may continue the IS counter when reconfiguring the BLER from a first BLER threshold 1106 to a second BLER threshold 1108 (e.g., from the 'strict' BLER threshold to the more 'relaxed' threshold). For example, the WTRU may continue the RLM process but apply a reward (e.g., adjusting one or more timers and/or counters) to account for relaxed BLER condition after the reconfiguration. In one embodiment, the WTRU may reset the IS counter (and/or the timer 1104) when reconfiguring from the more 'relaxed BLER threshold to the more 'strict' BLER threshold. For example, the WTRU may reset the RLM process but apply a penalty (e.g., adjusting one or more timers and/or counters) to account for poor radio conditions that existed before the reconfiguration. In some examples, the WTRU may apply a fairness criteria/criterion by setting the value of the timer 1104 (e.g., N311) such that a new RLM configuration or reconfiguration has a chance to recover the link before RLF.

Compensation generally refers to one or more modifications/changes made to timers, counters and/or logic associated with the determination of an existing RLM status. The compensation may be based on the existing RLM status after reconfiguration and/or the RLM status prior to reconfiguration. The compensation may be a plurality of such compensations and may include or be in addition to a reset of the RLM process.

Representative WTRU Procedure to Handle Reconfiguration of RLM-RS Configuration

A WTRU may receive a control message to reconfigure one or more aspects related to the RLM-RS configuration. For example, one result of such reconfiguration may be that the number of RLM-RS resources monitored by the WTRU may be updated and may include that any of:

(1) 0, some or all RS resources that generated IS indications may be removed/released;

(2) 0, some or all RS resources which generate OOS resources may be removed/released; and/or (3) 0 or more new RLM-RS resources may be added/setup, among others;

Representative Realizations of RLM-RS Reconfigurations

Figure 12:
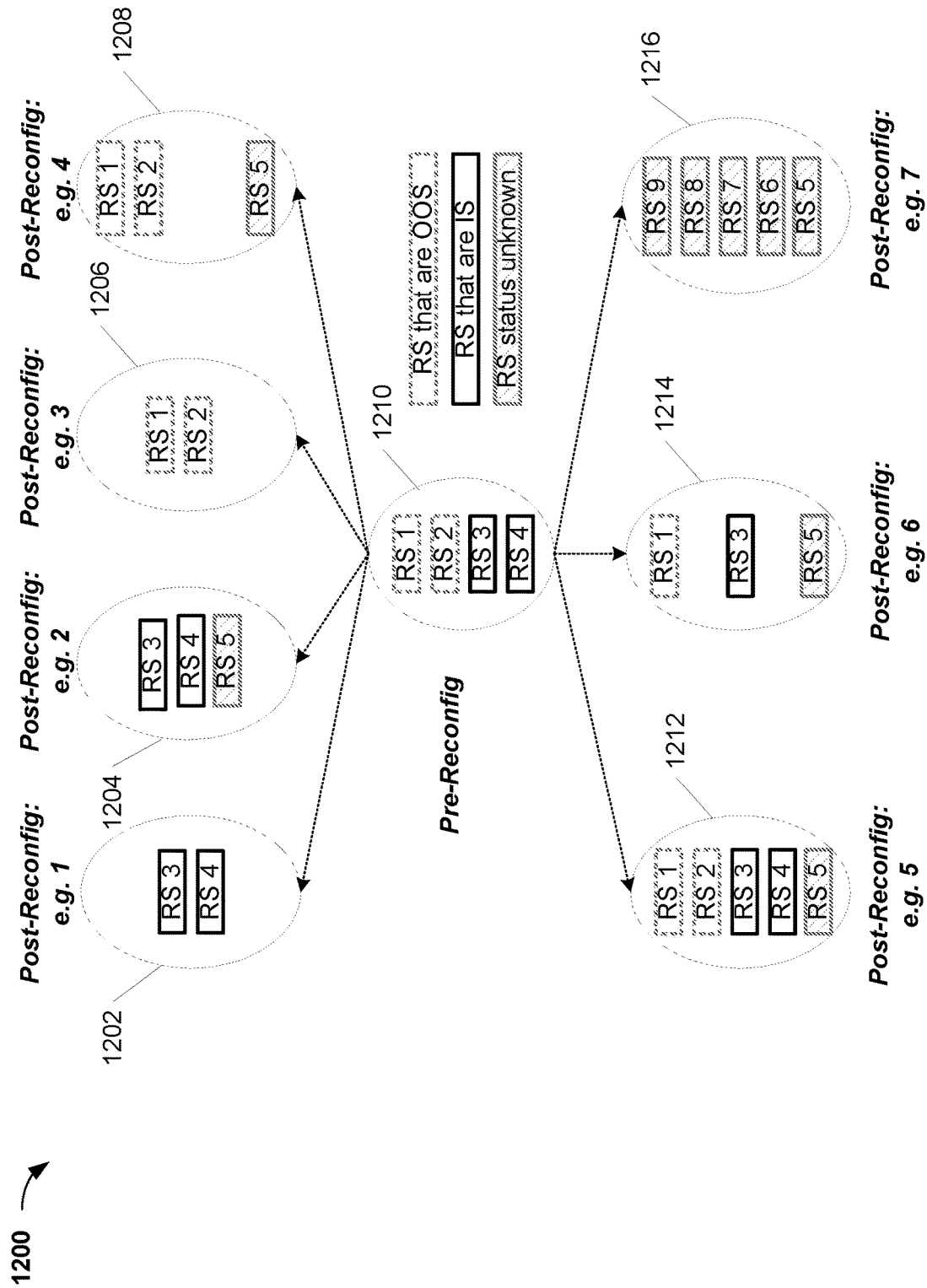
FIG. 12 is a diagram illustrating examples of RLM-RS reconfigurations.

FIG. 12 is a diagram illustrating examples of RLM-RS reconfigurations 1200. Referring to FIG. 12, various reconfigurations may be realized. For example, after the WTRU determines that the number of RLM-RS resources monitored by the WTRU may be updated, the WTRU may reconfigure from the current RLM configuration(s) (e.g., pre-reconfig 1210) to at least a new RLM configuration (e.g., any of: post-reconfig 1202, 1204, 1206, 1208, 1212, 1214, and/or 1216). For example, the WTRU may reconfigure the RLM resources monitored based on the status of the pre-reconfig RS resources. For example. (1) if certain RS resources have one or a consecutive number of OOS indications (e.g., RS 1 and RS 2) and other RS resources have one or a consecutive number of IS indications (e.g., RS 3 and RS 4, the WTRU may reconfigure to post-reconfig 1202 in which only RS 3 and RS 4 may be monitored post reconfiguration; (2) post-reconfig 1204 in which RS 3 and RS 4 may be monitored post reconfiguration and monitoring for RS 5 may be started post reconfiguration; (3) post-reconfig 1206 in which RS 1 and RS 2 may be monitored post reconfiguration; (4) post-reconfig 1208 in which the RS 1 and RS 2 may be monitored post reconfiguration and monitoring for RS 5 may be started post reconfiguration; (5) post-reconfig 1212 in which RS 1, RS 2, RS 3 and RS 4 may be monitored post reconfiguration and monitoring for RS 5 may be started post reconfiguration; (6) post-reconfig 1214 in which the RS 1 and RS 3 may be monitored post reconfiguration and monitoring for RS 5 may be started post reconfiguration; and/or (7) post-reconfig 1216 in which RS 5, RS 6, RS 7, RS 8, and RS 9 may be started post reconfiguration, among others.

Although seven different post configurations are shown, any number of different post configurations are possible and may be based on the status of the RLM process prior to reconfiguration.

In some embodiments, one or more RLM-RS resources added/setup may belong to a different RLM-RS type. The WTRU may be monitoring RLM-RS(s) based on Synchronization Signal Block (SSB) for RLM, and upon receiving a reconfiguration, the WTRU may switch to RLM-RS(s) based on CSI-RS type or vice versa. In some examples, the WTRU may be configured to report RLM-RSs that generate OOS indications and/or RLM-RSs that generate IS indications. The report, for example, may enable the network (e.g., via a network entity) to reconfigure RLM-RSs and/or change the RLM-RS type.

In certain representative embodiments, the RLM-RS reconfiguration handling may be a function of the current RLM process status such that the WTRU may update the RLM process, when one or more RLM-RS are added/removed.

In one example, a WTRU may be configured to clear the OOS counter and/or to reset the T310 timer if running, when one, some or all of the RSs that generate OOS indications are removed after a RLM-RS reconfiguration. In some examples, the WTRU may apply a penalty or may apply fairness based on criterion/criteria, if a physical layer problem and/or a physical layer error occurred before the RLM-RS reconfiguration.

In one example, a WTRU may be configured to determine and/or declare a reconfiguration failure, if application/execution of the reconfiguration is detrimental (e.g., determined to be detrimental) to the current RLM process. For example, a WTRU may determine and/or declare a reconfiguration failure when a certain number of or all of the RSs that generate IS indication are removed as a result of the reconfiguration. For example, a WTRU may determine and/or declare a reconfiguration failure if OOS RSs (e.g., only OOS RSs) remain after the reconfiguration. The WTRU may report a reconfiguration failure to the network (e.g., a network entity) with an appropriate cause value indicating the RLM status. For example, the WTRU may indicate an identity of the RSs that are IS and/or an identity of the RSs that are OOS.

In another example, a WTRU may be configured to clear IS counter, when one, some or all of the RSs that generate IS are removed after a RLM-RS reconfiguration. In further examples, a WTRU may be configured to continue the RLM counters/timers when none of the existing RSs are removed and/or one or more RLM-RSs are added.

In certain representative embodiments, the WTRU may be configured to continue the RLM counters/timers when one or more RSs are added while keeping the existing RSs after a reconfiguration. The WTRU may be configured to reset the RLM counters/timers when one or more existing RSs are removed after a reconfiguration.

Representative Procedures for Handling RLM and SUL Carriers (for Example Including Conditions to Determine the Use for and/or Need for SUL Transmission)

A WTRU may be configured to access SUL (e.g., by initiate transmissions on the SUL), for example, when the transmission may be beneficial/desirable over transmission of the RUL and/or may complement ongoing transmissions in the RUL. For example, the SUL may provide enhanced coverage compared to the RUL. For example, the SUL may include or be a low frequency carrier (e.g., below a threshold frequency) or a high frequency carrier (e.g., above a threshold frequency) and/or may include enhanced beamforming capability. For example, the SUL access may be based on: (1) WTRU autonomous procedures; (2) implicitly signalling; and/or (3) upon reception of explicit signalling, among others.

A WTRU may be configured to initiate transmissions on the SUL based on one or more preconfigured events. The preconfigured events may correspond to DL quality below a threshold and/or one or more metrics associated with a control channel performance (e.g., BLER threshold or the likes) which may be indicative of WTRU entering a coverage region where UL path loss exceeds a threshold, for example, resulting in UL RLF. For example, the WTRU may be configured with a SUL and access to the SUL may be applicable when any of the following conditions are satisfied:

(1) an implicit determination of UL path loss exceeding a threshold. For example, using a DL measurement that indicate cell quality below a threshold such that the cell quality may be derived based on N best beams. One realization may be based on measurement event A2 or the likes, and the WTRU may be configured with a specific action on the SUL when the A2 measurement event is satisfied.

(2) a characteristic associated with DL beams, e.g., a type of RS associated with the DL control channel. For example, the WTRU may determine SUL transmissions are applicable when DL control beams are QCLed with SS Block.

(3) an explicit configuration of a subset of RSs, measurements of which may determine the use and/or need for a SUL. For example, the WTRU may be explicitly configured with a subset of RSs associated with wide beams and/or beams associated with a subset of TRPs. If the RS Received Power (RSRP), RS Received Quality (RSRQ) and/or Signal to Interference plus Noise Ratio (SINR) associated with the subset of RS is below a threshold, the WTRU may determine that SUL access may be used and/or needed.

(4) a characteristic associated with the DL control channel. For example, the WTRU may determine that SUL access may be used and/or needed when more than N DCIs are received with an aggregation level of x and higher. For example, the WTRU may determine that the SUL access may be used and/or needed when a DCI is received on a predefined CORESET.

(5) criterion/criteria to access the SUL may be a function of the RLM status. For example, the WTRU may determine that the SUL access may be used and/or needed when lower layer problems/errors are determined and/or detected. For example, the WTRU may determine that the SUL access may be used and/or needed when the T310 timer is running, the T310 timer is running for longer than a predefined time and/or the T310 timer is close to expiry. For example, the WTRU may determine that the SUL access may be used and/or needed when the radio link quality is worse than a first BLER threshold. For example, the WTRU may determine that the SUL access may be used and/or needed when a number of OOS indications is above a threshold.

(6) criterion/criteria to access the SUL may be a function of beam management status.

(i) In one example, the WTRU may be configured to access the SUL upon a loss of a beam paired link in a RUL. For example, the WTRU may detect a loss of a beam paired link during a beam management procedure. For example, the WTRU may be configured to access the SUL when the WTRU cannot determine that a UL beam in the RUL is valid/usable (e.g., when a predefined time after the UL beam was confirmed to be valid/usable expires). For example, the WTRU may be configured to access the SUL when a beam recovery procedure fails, for example, when the WTRU cannot identify a candidate beam and/or when a candidate beam is below threshold.

(ii) In another example, the WTRU may be configured to access the SUL when an UL beam is not available in the RUL, for example after a period of inactivity during which a UL beam pair is not maintained, for example, when the DL beam changes during a period of inactivity. Upon arrival of the UL control and/or data, the WTRU may be configured to select a UL carrier based on an activity level and characteristics of the UL data. For example, the WTRU may be configured to perform transmissions in the SUL for a control procedure (e.g., a SI request and/or a RAN area update in an INACTIVE state, among others) and/or may transfer small UL data (e.g., with a size below a preconfigured threshold). In some examples, the WTRU may be explicitly configured in a DL message (e.g., in a paging message) as to whether a corresponding UL message (e.g., a paging response) is to be and/or needs to be transmitted in the SUL or the RUL. In certain representative embodiments, the WTRU may be configured to transmit UL control and/or data after a period of inactivity, if there is a change in the DL beam.

(7) status of time alignment timer associated with the RUL and the SUL. For example, when the time alignment timer associated with a RUL carrier is expired, the WTRU may determine that the SUL access may be appropriate and/or required. For example, the WTRU may make such assumptions (for example that use of a SUL carrier is possible) when (e.g., only when) time alignment timer associated with the SUL is running (e.g., still running and valid).

(8) upon receiving a PUCCH/SRS release from lower layers. For example, upon receiving a lower layer indication that PUCCH/SRS associated with a RUL be released, the WTRU may determine that SUL access may be appropriate and/or needed.

(9) a condition based on triggers local to the WTRU. For example, the WTRU may access a SUL upon determining that a RUL is not usable based on an implementation constraint. For example, upon determining and/or detecting (e.g., using proximity sensor, external information and/or any other sensor, among others) that the beamforming capability is temporarily hindered, (e.g., due to a human body, a hand holding the WTRU/device, and/or a head blockage), the WTRU may switch to a SUL since beamforming gain on a RUL may be reduced. In some examples, the WTRU may determine that the RUL may not be usable due to in-device-coexistence constraints. The WTRU may be configured to report an occurrence of a temporary restriction of a RUL access. For example, the WTRU may report to the network (e.g., a network entity) when the temporary restriction is no longer applicable.

(10) When a number of HARQ retransmissions is above a threshold.

In certain representative embodiments, the WTRU may switch to SUL transmission triggering one or more actions from WTRU. The WTRU may perform one or more actions upon initiating transmissions in the SUL and/or when criterion/criteria to access the SUL is satisfied. For example, a switch of the UL between a RUL and a SUL contemplates (e.g., may imply) that the WTRU may assume different characteristics for the DL transmissions. For example, a switch to the SUL may indicate that the WTRU is closer to a cell edge and may trigger one or more actions at the WTRU. For example, upon initiating transmissions on the SUL and/or when the criterion/criteria to access the SUL is satisfied, the WTRU may:

(1) apply a reconfiguration of one or more aspects associated with control channel reception.
  (i) For example, the WTRU may monitor PDCCH candidates in a higher aggregation level. For example, the WTRU may monitor different DCI format applicable for UL grants on the SUL.
  (ii) For example, the WTRU may monitor a specific subset of control channels. In one example, the WTRU may start to monitor a DCI in a control channel associated with narrow beams and/or beams that provide enhanced coverage.
(2) apply a reconfiguration of one or more aspects associated with radio link monitoring.
  (i) For example, the WTRU may change to a different hypothetical PDCCH configuration for determining a BLER to generate IS/OOS indications for the RLM. For example, an aggregation level of the hypothetical PDCCH may be switched to a higher level. For example, a size of a DCI message associated with the hypothetical PDCCH configuration may be different for a SUL and a RUL.
  (ii) For example, the WTRU may use a different (e.g., lower) BLER threshold when SUL access is initiated.
  (iii) For example, the WTRU may monitor a preconfigured subset of RSs for RLM. In one example, a subset may correspond to narrow beams and/or beams that provide enhanced coverage.
  (iv) For example, the WTRU may be configured to report a status of the RLM process upon switching to the SUL. For example, the report may include a quantized BLER of a hypothetical control channel. For example, the report may include a status (e.g., an IS counter and/or an OOS counter) of RSs configured for RLM. For example, the report may indicate the status (e.g., whether running or not) of the T310 timer, explicitly and/or implicitly (e.g., the report triggered, when the T310 timer is started when the SUL transmission is ongoing or the T310 timer is ongoing when SUL access is started).
(3) apply a reconfiguration of one or more aspects related to measurements.
  (i) For example, the WTRU may trigger measurement of a specific subset of RSs. In one example, the subset may be associated with narrow beams or beams that provide enhanced coverage.
  (ii) For example, the WTRU may trigger neighbour measurements, when initial transmission on a SUL is initiated and/or when one or more conditions to access the SUL are satisfied. For example, the WTRU may use a combination of s-measure being below a threshold and a SUL transmission trigger to start neighbour measurements.
  (iii) For example, the WTRU may trigger transmission of a measurement report related to a handover event. For example, the WTRU may transmit a measurement report for one or more candidate cells whose time to trigger is running
(4) apply a reconfiguration related to mobility aspect
  (i) For example, the WTRU may be configured with access of a SUL as one of the conditions to apply a mobility reconfiguration (e.g., a conditional reconfiguration). For example, the conditions may include the quality of the neighbour measurement being above a threshold, alone or in combination with other conditions. For example, the conditions may include that a T312 timer is running
(5) suspend one or more UL transmissions on a RUL
  (i) For example, the WTRU may be configured to suspend UL transmissions in a RUL, for example. (1) with exception of SRS transmissions. For example, upon initiating SUL access, the WTRU may clear outstanding grants applicable for the RUL. For example, upon initiating SUL access, the WTRU may clear outstanding Power Headroom Reports (PHRs) applicable for a RUL.
(6) One or more of the above reconfiguration may refer to implicit and/or explicit reconfiguration.

The contents of each of the following are incorporated by reference herein: (1) 3GPP RAN1 chairman notes from RAN1 #89AH; and (2) 3GPP RAN1 chairman notes from RAN1 #90.

Figure 13:
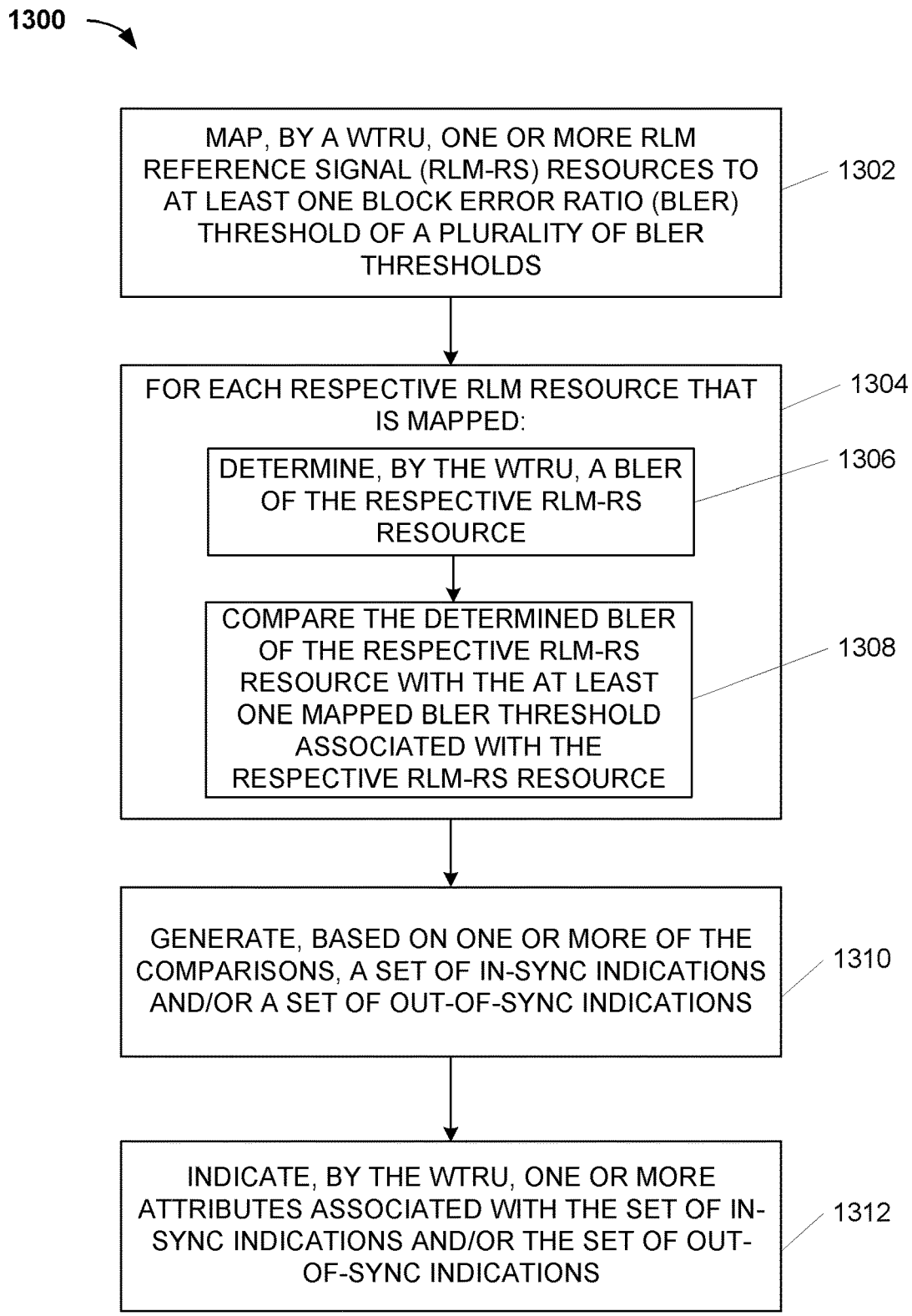
FIG. 13 is a diagram illustrating a first method of an RLM procedure according to one or more embodiments.

FIG. 13 is a diagram illustrating a method of an RLM procedure according to embodiments discussed herein.

According to various embodiments, a WTRU may include a transmitter, a receiver (and/or transceiver), and a processor performing a method 1300 illustrated in FIG. 13. Referring to FIG. 13, at operation 1302, a WTRU may map one or more RLM-RS resources to at least one BLER threshold of a plurality of BLER thresholds. At operation 1304, for each respective RLM resource that is mapped, the WTRU may determine a BLER of the respective RLM-RS resource at operation 1306. At operation 1308, the WTRU may compare the determined BLER of the respective RLM-RS resource with the at least one mapped BLER threshold associated with the respective RLM-RS resource. At operation 1310, the WTRU may generate, based on one or more of the comparisons, a set of in-sync indications and/or a set of out-of-sync indications. At operation 1312, the WTRU may indicate one or more attributes associated with the set of in-sync indications and/or the set of out-of-sync indications.

According to various embodiments, a respective BLER threshold of the plurality of BLER threshold may be associated with a service type. For example, the service type may be any of: ultra-reliable low latency (URLLC), enhanced massive mobile broadband (eMBB), and/or enhanced machine-type communication (eMTC). According to various embodiments, the WTRU may obtain a type of service associated with a communication, and may select the at least one BLER threshold in accordance with the obtained type of service.

According to various embodiments, the one or more attributes may be or may indicate any of: (1) a respective RLM-RS resource, an RLM-RS resource group, or an RLM-RS type associated with the set of in-sync indications and/or the set of out-of-sync indications, (2) a CORESET or a CORESET group associated with the set of in-sync indications and/or the set of out-of-sync indications, (3) a beam group associated with the set of in-sync indications and/or the set of out-of-sync indications, and/or (4) a respective BLER threshold associated with the set of in-sync indications and/or the set of out-of-sync indications.

According to various embodiments, the WTRU may be configured to map each respective RLM-RS resource to one BLER threshold of the plurality of BLER thresholds. According to various embodiments, the WTRU may be configured to compare the determined BLER of each respective RLM-RS resource to the at least one mapped BLER threshold.

According to various embodiments, the WTRU may group two or more of the RLM-RS resources that are associated with any of: (1) one CORESET; (2) a group of CORESETs; and/or (3) a beam group. According to various embodiments, the WTRU may determine a composite BLER specific to the grouped RLM-RS resources based on the determined BLER, and compare the composite BLER specific to the grouped RLM-RS resources with one of the at least one mapped BLER threshold.

According to various embodiments, the WTRU may be configured to generate the set of one or more in-sync indications and/or the set of one or more out-of-sync indications for: (1) each comparison of the determined BLER of the respective RLM-RS resource with the at least one mapped BLER threshold associated with the respective RLM-RS resource, or (2) a set of comparisons associated with the grouped RLM-RS resources.

According to various embodiments, the WTRU may be configured to generate the set of one or more in-sync indications and/or the set of one or more out-of-sync indications associated with: (1) the at least one mapped BLER threshold; (2) a subset of the at least one mapped BLER threshold; or (3) for each of the at least one mapped BLER threshold.

According to various embodiments, the WTRU may be configured to map each RLM-RS resource to two or more BLER thresholds of the plurality of BLER thresholds. According to embodiments, the WTRU may be configured to compare the determined BLER associated with each respective RLM-RS resource or a group of RLM-RS resources to the two or more mapped BLER thresholds.

According to embodiments, the WTRU may be configured to generate a composite set of in-sync indications and/or out-of-sync indications for each of the at least one mapped BLER thresholds or N composite sets of in-sync indications and/or out-of-sync indications for M BLER thresholds, where N and M are positive integer values, and N is less than or equal to M.

According to various embodiments, the WTRU may be configured to determine, prior to the mapping, a first set of BLER thresholds of the plurality of BLER thresholds to be mapped with the one or more RLM-RS resources.

According to various embodiments, the WTRU may be configured to determine, after the mapping, that a second set of BLER thresholds of the plurality of BLER thresholds is to be mapped with the one or more RLM-RS resources and/or other RLM-RS resources. According to embodiments, the WTRU may modify a RLM configuration from a mapping of the one or more RLM-RS resources with the first set of BLER thresholds to a different mapping of the one or more RLM-RS resources and/or the other RLM-RS resources with the second set of BLER thresholds or may remap the one or more RLM-RS resources and/or the other RLM-RS resources with the second set of BLER thresholds. According to various embodiments, the WTRU may be configured to compare the determined BLER of the respective RLM-RS resources with the second set of modified or remapped BLER thresholds. According to embodiments, the second set of BLER thresholds is same as or different from the first set of BLER thresholds.

According to various embodiments, the WTRU may reconfigure at least one BLER threshold of the plurality of BLER thresholds from a first BLER threshold to a second BLER threshold. According to various embodiments, after the reconfiguring, the one or more attributes associated with the set of in-sync indications and/or the set of out-of-sync indications may be based on a configuration of an RLM process prior to and after the reconfiguration.

According to various embodiments, the WTRU may, in one or more evaluation periods after the reconfiguration, provide: (1) a first type of compensation associated with the set of out-of-sync indications prior to the reconfiguration on condition that the reconfiguration of the at least one BLER threshold of the plurality of BLER thresholds transitioned from a more relaxed BLER threshold to a stricter BLER threshold, or (2) a second type of compensation on condition that the reconfiguration of the at least one BLER threshold of the plurality of BLER thresholds transitioned from a stricter BLER threshold to a more relaxed BLER threshold. According to various embodiments, the first type of compensation and the second type of compensation are time-based compensations to extend or shorten a timer.

According to various embodiments, the WTRU may determine the one or more attributes after the reconfiguration using compensation, and the one or more attributes may be determined by determining the set of in-sync indications and/or the set of out-of-sync indications after the reconfiguration and a penalty or a reward associated with the set of in-sync indications and/or out-of-sync indications prior to the reconfiguration. According to various embodiments, the WTRU may select the penalty based on the set of out-of-sync indications prior to reconfiguration for the compensation of the set of out-of-sync indications after reconfiguration on condition that the at least one BLER threshold of the plurality of BLER thresholds transitioned from a relaxed BLER threshold to a stricter BLER threshold. According to various embodiments, the WTRU may select the reward based on the set of out-of-sync indications prior to reconfiguration for the compensation of the set of out-of-sync indications after reconfiguration on condition that the at least one BLER threshold of the plurality of BLER thresholds transitioned from a strict BLER threshold to a more relaxed BLER threshold. According to embodiments, the WTRU may select the reward based on the set of in-sync indications prior to reconfiguration for the compensation of the set of in-sync indications after reconfiguration on condition that the at least one BLER threshold of the plurality of BLER thresholds transitioned from a relaxed BLER threshold to a stricter BLER threshold. According to embodiments, the WTRU may select the penalty based on the set of in-sync indications prior to reconfiguration for the compensation of the set of in-sync indications after reconfiguration on condition that the at least one BLER threshold of the plurality of BLER thresholds transitioned from a strict BLER threshold to a more relaxed BLER threshold.

FIG. 14 is a diagram illustrating a method of an RRC reconfiguration for an RLM procedure according to embodiments discussed herein.

According to various embodiments, a WTRU may include a transmitter, a receiver (and/or transceiver), and a processor performing a method 1400 implemented by a WTRU to transition from a first RRC configuration to a second RRC configuration, as a RCC reconfiguration illustrated in FIG. 14. Referring to FIG. 14, in an example, at operation 1402, a WTRU may receive the second RRC configuration indicating a first set of BLER thresholds that is different from one or more BLER thresholds indicated in the first RRC configuration. At operation 1404, the WTRU may generate, based on the first set of BLER thresholds after reception of the second RRC configuration, one or more in-sync indications and/or one or more out-of-sync indications. At operation 1406, the WTRU may indicate one or more attributes associated with the one or more in-sync indications and/or the one or more out-of-sync indications.

According to various embodiments, the WTRU may indicate the one or more attributes associated with the one or more in-sync indications and/or the one or more out-of-sync indications by compensating, by the WTRU based on at least an existing RLM status, for a difference between the first RRC configuration and the second RRC configuration as part of the transition from the first RRC configuration to the second RRC configuration. According to various embodiments, the compensation(s) for the difference between the first RRC configuration and the second RRC configuration includes any of: (1) the WTRU being configured to apply a penalty to counters and/or timers to account for differences in an ongoing RLM process; (2) the WTRU being configured to apply fairness to avoid a premature radio link failure (RLF); (3) the WTRU being configured to update an expiry of a timer to avoid an RLF until after expiry of the updated timer; and/or (4) the WTRU being configured to continue performing an RLM process or to reset an RLM process selectively, based on one or more rules to avoid the premature RLF or a delayed RLF.

FIG. 15 is a diagram illustrating another method of an RLM procedure according to embodiments discussed herein.

According to various embodiments, a WTRU may include a transmitter, a receiver (and/or transceiver), and a processor performing a method 1500 for RLM as illustrated in FIG. 15. Referring to FIG. 15, in an example, at operation 1502, a WTRU may receive a configuration to update one or more of the RLM parameters. At operation 1504, the WTRU may determine an action to take based on a status of a current RLM process and the received configuration. At operation 1506, the WTRU may take the action with respect to the current RLM process based on the determination.

According to various embodiments, the action mentioned above may include any of: (1) resetting the current RLM process; (2) resetting the current RLM status; (3) continuing the current RLM process; (4) continuing the current RLM status; (5) applying a penalty to a new RLM process; (5) configuring a new RLM process and delaying a determination of radio link quality for a period; (6) declaring a radio link failure on condition that a reconfiguration is detrimental to an RLM procedure; and/or (7) determining an explicit indication in a reconfiguration message and taking the action associated with the explicit indication.

According to various embodiments, the WTRU may be configured to reset the current RLM process on a condition that a current configuration of RLM process is associated with a stringent radio link quality requirement and the received configuration is associated with a more relaxed radio link quality requirement.

According to various embodiments, the WTRU may be configured to continue the current RLM process on condition that the current configuration of RLM process is associated with a relaxed radio link quality requirement and the received configuration is associated with a more stringent radio link quality requirement.

According to various embodiments, the WTRU may be configured to apply a penalty to the new RLM process. For example, the WTRU may be configured to apply any of: (1) a shorter T310 timer than nominal; (2) a smaller N310 value and/or a larger N311 value than nominal for the new RLM process, on a condition that any of: (i) the T310 timer was already running; (ii) a remaining time is less than a threshold; and/or (iii) a number of out-of-sync indications is above a threshold for the current RLM process.

According to various embodiments, the WTRU may be configured to delay the determination of radio link quality for the period. For example, the WTRU may be configured not to declare a radio link failure prior to a minimum time having elapsed. In an example, the minimum time is at least as long as a time to receive in-sync indications sufficient to stop a running radio link failure timer.

FIG. 16 is a diagram illustrating a method of RLM and supplementary uplink (SUL) transmissions according to embodiments discussed herein.

According to various embodiments, a WTRU may include a transmitter, a receiver (and/or transceiver), and a processor performing a method 1600 for RLM as illustrated in FIG. 16. Referring to FIG. 16, in an example, at operation 1602, a WTRU may identify a RLM status. At operation 1604, the WTRU may initiate a transmission on a supplementary uplink (SUL) carrier based on one or more conditions associated with the identified RLM status. At operation 1606, the WTRU may reconfigure one or more current configurations of the WTRU after the initiation of the transmission on the SUL carrier.

According to various embodiments, the one or more conditions may include any of: (1) a timer: (i) running; (ii) running for longer than a predefined period; and/or (iii) expiring; (2) a radio link quality being worse than a BLER threshold; and/or (3) a number of out-of-sync indications being above a threshold.

According to various embodiments, the WTRU may reconfigure the one or more current configurations by any of the following process: (1) updating a preconfigured hypothetical control channel configuration; (2) updating a BLER threshold for RLM; (3) triggering measurements of one or more neighbor cells; (4) transmitting a measurement report associated with a handover; and/or (5) triggering a report of a current RLM status or a status of a RLM process.

FIG. 17 is a diagram illustrating another method of RLM and SUL transmissions according to embodiments discussed herein.

According to various embodiments, a WTRU may include a transmitter, a receiver (and/or transceiver), and a processor performing a method 1700 for RLM as illustrated in FIG. 17. Referring to FIG. 17, in an example, at operation 1702, a WTRU may determine that one or more conditions are satisfied. At operation 1704, the WTRU may initiate a transmission on an SUL carrier based on the determination. At operation 1706, the WTRU may reconfigure one or more current configurations of the WTRU after the initiation of the transmission on the SUL carrier.

According to various embodiments, the one or more conditions may include any of: (1) an uplink path loss exceeding a threshold; (2) a certain type of reference signal associated with a downlink control channel being identified; (3) a measurement of a subset of reference signals being below a threshold; (4) more than a first number of downlink control information (DCI) being received having an aggregation level being equal or higher than a predetermined level; (5) a DCI being received on a predefined CORESET; (6) one or more criteria to access the SUL carrier being a function of a RLM status and being satisfied; (7) one or more criteria to access the SUL carrier being a function of a beam management status and being satisfied; (8) when a time alignment timer associated with a regular uplink (RUL) carrier being expired; (9) receiving an indication from a lower layer indicating that a Physical Uplink Control Channel (PUCCH) or a Sounding Reference Signal (SRS) associated with RUL being released; and/or (10) when a number of hybrid automatic repeat request (HARQ) retransmissions being above a threshold.

According to various embodiments, the WTRU may reconfigure the one or more current configurations by any of the following process: (1) reconfiguring to monitor one or more Physical Downlink Control Channel (PDCCH) candidates in a higher aggregation level compared with a current configured aggregation level; (2) reconfiguring to monitor a specific subset of control channels; (3) adjusting to a different aggregation level from a current aggregation level of a PDCCH; (4) using a different BLER threshold compared with a current BLER threshold; (5) reconfiguring to monitor a preconfigured subset of reference signals for RLM; (6) reporting a status of a RLM process; (7) triggering measurements of one or more neighbor cells; (8) transmitting a measurement report associated with a handover; and/or (9) triggering a report of a current RLM status or a status of a RLM process.

According to various embodiments, the WTRU may reconfigure the one or more current configurations by applying a mobility reconfiguration. According to various embodiments, the WTRU may reconfigure the one or more current configurations by suspending or delaying uplink transmissions on a RUL carrier.

According to various embodiments, the WTRU may determine that one or more conditions are satisfied, and each of the one or more conditions are associated with a respective RLM status. In addition, the WTRU may determine that at least one criteria to access an SUL carrier is satisfied. The WTRU may reconfigure one or more current RLM configurations of the WTRU, based on the determination of the one or more conditions and the at least one criteria are satisfied. Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method, implemented by a wireless transmit/receive unit (WTRU), to transition from a first Radio Resource Control (RRC) configuration to a second RRC configuration, as an RRC reconfiguration, the method comprising:
    receiving, by the WTRU, configuration information indicating the second RRC configuration associated with a first set of Block Error Ratio (BLER) thresholds that is different from one or more BLER thresholds associated with the first RRC configuration;
    generating, based on the first set of BLER thresholds after reception of the configuration information indicating the second RRC configuration, one or more in-sync indications and/or one or more out-of-sync indications;
    indicating, by the WTRU, one or more attributes associated with the one or more in-sync indications and/or the one or more out-of-sync indications; and
    determining, during a transition to the second RRC configuration and based on at least an existing radio link monitoring (RLM) status, whether to apply a compensation by the WTRU for a new RRC configuration process associated with the second RRC configuration.

2. The method of claim 1, wherein indicating of the one or more attributes associated with the one or more in-sync indications and/or the one or more out-of-sync indications includes compensating, by the WTRU based on at least an existing radio link monitoring (RLM) status, for a difference between the first RRC configuration and the second RRC configuration as part of the transition from the first RRC configuration to the second RRC configuration.

3. The method of claim 2, wherein the compensating for the difference between the first RRC configuration and the second RRC configuration includes any of: (1) applying a penalty to counters and/or timers to account for differences in an ongoing RLM process; (2) applying fairness to avoid a premature radio link failure (RLF); (3) updating an expiry of a timer to avoid an RLF until after expiry of the updated timer; or (4) continuing an RLM process or resetting an RLM process selectively based on one or more rules to avoid the premature RLF or a delayed RLF.

4. The method of claim 1, wherein the one or more attributes indicate any of:
    a respective RLM-RS resource, an RLM-RS resource group, or an RLM-RS type associated with the set of in-sync indications and/or the set of out-of-sync indications;
    a CORESET or a CORESET group associated with the set of in-sync indications and/or the set of out-of-sync indications;
    a beam group associated with the set of in-sync indications and/or the set of out-of-sync indications; and
    a respective BLER threshold associated with the set of in-sync indications and/or the set of out-of-sync indications.

5. The method of claim 1, further comprising:
    obtaining, by the WTRU, a type of service associated with a communication; and
    selecting, by the WTRU, at least one BLER threshold in accordance with the obtained type of service.

6. The method of claim 1, further comprising:
    mapping, by the WTRU, one or more RLM reference signal (RLM-RS) resources to at least one BLER threshold of the first set of BLER thresholds, for each respective RLM-RS resource that is mapped:
        determining, by the WTRU, a BLER of the respective RLM-RS resource, and
        comparing the determined BLER of the respective RLM-RS resource with the at least one mapped BLER threshold associated with the respective RLM-RS resource.

7. The method of claim 6, further comprising:
    grouping two or more of the RLM-RS resources that are associated with any of: one CORESET, a group of CORESETs, or a beam group;
    determining a composite BLER specific to the grouped RLM-RS resources based on the determined BLER; and
    comparing the composite BLER specific to the grouped RLM-RS resources with one of the at least one mapped BLER threshold.

8. The method of claim 7, wherein the generating of the one or more in-sync indications and/or one or more out-of-sync indications comprises generating the one or more in-sync indications and/or one or more out-of-sync indications for: (1) each comparison of the determined BLER of the respective RLM-RS resource with the at least one mapped BLER threshold associated with the respective RLM-RS resource, or (2) a set of comparisons associated with the grouped RLM-RS resources.

9. The method of claim 6, wherein the generating of the one or more in-sync indications and/or one or more out-of-sync indications comprises generating the one or more in-sync indications and/or one or more out-of-sync indications associated with: (1) the at least one mapped BLER threshold; (2) a subset of the at least one mapped BLER threshold; or (3) for each of the at least one mapped BLER threshold.

10. The method of claim 6, wherein:
the mapping of the one or more RLM-RS resources includes mapping each RLM-RS resource to two or more BLER thresholds of the first set of BLER thresholds; and
the comparing of the determined BLER of the respective RLM-RS resource with the at least one mapped BLER threshold includes comparing of the determined BLER associated with each respective RLM-RS resource or a group of RLM-RS resources to the two or more mapped BLER thresholds.

11. The method of claim 6, wherein the generating of the one or more in-sync indications and/or one or more out-of-sync indications comprises generating a composite set of in-sync indications and/or out-of-sync indications for each of the at least one mapped BLER thresholds or N composite sets of in-sync indications and/or out-of-sync indications for M BLER thresholds, where N and M are positive integer values, and N is less than or equal to M.

12. The method of claim 6, further comprising:
determining, prior to the mapping, a first set of BLER thresholds to be mapped with the one or more RLM-RS resources.

13. The method of claim 12, further comprising:
determining, after the mapping, that a second set of BLER thresholds is be mapped with the one or more RLM-RS resources and/or other RLM-RS resources; and
modifying from a mapping of the one or more RLM-RS resources with the first set of BLER thresholds to a different mapping of the one or more RLM-RS resources and/or the other RLM-RS resources with the second set of BLER thresholds or remapping the one or more RLM-RS resources and/or the other RLM-RS resources with the second set of BLER thresholds,
wherein the comparing of the determined BLER with the at least one mapped BLER threshold includes comparing the determined BLER of the respective RLM-RS resources with the second set of modified or remapped BLER thresholds.

14. The method of claim 13, wherein after the reconfiguring, the one or more attributes associated with the one or more in-sync indications and/or the one or more out-of-sync indications are based on configuration information of an RLM process prior to and after the reconfiguration of the at least one BLER threshold.

15. The method of claim 1, further comprising:
reconfiguring at least one BLER threshold of the first set of BLER thresholds from a first BLER threshold to a second BLER threshold.

16. A method, implemented by a wireless transmit/receive unit (WTRU), to transition from a first Radio Resource Control (RRC) configuration associated with first set of Block Error Ratio (BLER) thresholds to a second RRC configuration associated with second BLER thresholds, the method comprising:
receiving configuration information indicating the second RRC configuration;
determining, during a transition to the second RRC configuration based on an existing radio link monitoring (RLM) status whether to apply a compensation for a new RRC configuration process associated with the second RRC configuration;
determining whether a Radio Link Failure (RLF) has occurred based on the second BLER thresholds associated with the second RRC configuration and the determined compensation to be applied; and
sending, by the WTRU, a message, on condition that the RLF occurred.

17. The method of claim 16, wherein a respective BLER threshold of the first or second BLER thresholds is associated with a respective service type.

18. The method of claim 17, wherein the respective service type is any of: ultra-reliable low latency (URLLC), enhanced massive mobile broadband (eMBB), or enhanced machine-type communication (eMTC).

19. A wireless transmit/receive unit (WTRU) comprising:
a processor configured to determine a transition from a first radio resource control (RRC) configuration associated with a first set of block error ratio (BLER) thresholds to a second RRC configuration associated with a second set of BLER thresholds;
a receiver configured to receive configuration information indicating the second RRC configuration;
the processor further configured to determine, during the transition to the second RRC configuration based on an existing radio link monitoring (RLM) status, whether to apply a compensation for a new RRC configuration process associated with the second RRC configuration; and
a transmitter configured to transmit an uplink transmission based on a determination that a radio link failure (RLF) has occurred, wherein the RLF is determined based on 1) the second set of BLER thresholds associated with the second RRC configuration and 2) the compensation to be applied.

20. The VVTRU of claim 19, wherein each respective BLER threshold of the first set of BLER thresholds is associated with a respective service type, and wherein the respective service type comprises any of: ultra-reliable low latency (URLLC), enhanced massive mobile broadband (eMBB), or enhanced machine-type communication (eMTC).

* * * * *